(12) United States Patent
Wang

(10) Patent No.: US 12,450,921 B2
(45) Date of Patent: Oct. 21, 2025

(54) METHOD AND APPARATUS FOR CALIBRATING ROLL ANGLE OF ON-BOARD CAMERA, DEVICE, AND STORAGE MEDIUM

(71) Applicant: TENCENT TECHNOLOGY (SHENZHEN) COMPANY LIMITED, Shenzhen (CN)

(72) Inventor: Haichuan Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 92 days.

(21) Appl. No.: 18/475,422

(22) Filed: Sep. 27, 2023

(65) Prior Publication Data
US 2024/0096113 A1 Mar. 21, 2024

Related U.S. Application Data

(63) Continuation of application No. PCT/CN2023/075618, filed on Feb. 13, 2023.

(30) Foreign Application Priority Data

Mar. 28, 2022 (CN) .......................... 202210311948.3

(51) Int. Cl.
*G06V 20/56* (2022.01)
*G06T 7/13* (2017.01)
*G06T 7/80* (2017.01)

(52) U.S. Cl.
CPC .............. *G06V 20/588* (2022.01); *G06T 7/13* (2017.01); *G06T 7/80* (2017.01)

(58) Field of Classification Search
CPC ...... G06V 20/588; G06V 10/761; G06T 7/13; G06T 7/80; G06T 7/97
See application file for complete search history.

(56) References Cited

U.S. PATENT DOCUMENTS 9,576,207 B2 * 2/2017 Chevalley ............ H04N 17/002
2012/0099766 A1 * 4/2012 Klein ........................ G06T 7/70
382/104

(Continued)

FOREIGN PATENT DOCUMENTS

CN 106355581 A 1/2017
CN 112017249 A 12/2020

(Continued)

OTHER PUBLICATIONS

The World Intellectual Property Organization (WIPO) International Search Report for PCT/CN2023/075618 May 22, 2023 5 Pages (including translation).

(Continued)

*Primary Examiner* — Brian P Yenke
(74) *Attorney, Agent, or Firm* — Anova Law Group, PLLC

(57) ABSTRACT

This application relates to the technical field of Internet of Vehicles, and discloses a method and an apparatus for calibrating a roll angle of an on-board camera, a device, and a storage medium. The method for calibrating a roll angle of an on-board camera includes obtaining an image frame sequence collected by the on-board camera while a vehicle is in motion, the image frame sequence comprising n image frames of a road captured by the on-board camera at n timestamps; selecting a plurality of image groups from the image frame sequence; obtaining lane line images corresponding to the plurality of image groups at a target roll angle, to obtain a lane line image set corresponding to the target roll angle; and determining the roll angle of the on-board camera based on lane line image sets corresponding to different roll angles.

20 Claims, 21 Drawing Sheets

(56) References Cited

U.S. PATENT DOCUMENTS

| | | | | |
|---|---|---|---|---|
| 2012/0281881 A1* | 11/2012 | Walter | ............... | B60W 40/114 |
| | | | | 382/104 |
| 2013/0265442 A1* | 10/2013 | Maekawa | ............... | G06T 7/80 |
| | | | | 348/187 |
| 2014/0085469 A1* | 3/2014 | Sakano | ............... | G06T 7/80 |
| | | | | 348/148 |
| 2015/0161456 A1* | 6/2015 | Chevalley | ............ | H04N 23/683 |
| | | | | 348/148 |
| 2016/0005164 A1* | 1/2016 | Roumeliotis | ...... | G01C 21/1652 |
| | | | | 901/1 |
| 2016/0121889 A1* | 5/2016 | Shimomura | ......... | G06V 20/588 |
| | | | | 701/41 |
| 2017/0061622 A1* | 3/2017 | Sakano | ............... | G06T 7/80 |
| 2017/0061623 A1* | 3/2017 | Jaehnisch | ............... | G06T 7/80 |
| 2017/0243069 A1* | 8/2017 | Shen | ............... | G06V 20/56 |
| 2020/0125859 A1* | 4/2020 | Sagong | ............... | G01S 19/40 |
| 2020/0349723 A1* | 11/2020 | Geva | ............... | G06V 20/56 |
| 2022/0067398 A1* | 3/2022 | Tamura | ............ | B60W 60/0053 |
| 2022/0309694 A1* | 9/2022 | Nobayashi | ............... | H04N 7/18 |
| 2023/0052270 A1* | 2/2023 | Gotliber | ............... | G06T 7/73 |
| 2024/0282006 A1* | 8/2024 | Wang | ............... | G06T 7/70 |
| 2024/0393479 A1* | 11/2024 | Xiao | ............... | G01S 19/393 |
| 2024/0428599 A1* | 12/2024 | Sun | ............... | G06V 20/588 |

FOREIGN PATENT DOCUMENTS

| | | |
|---|---|---|
| CN | 112184821 A | 1/2021 |
| JP | 2013129264 A | 7/2013 |

OTHER PUBLICATIONS

Joan Sola "Quaternion kinematics for the error-state Kalman filter." arXiv preprint arXiv:1711.02508 (2017).

Jeong-Kyun Lee et al. "Online extrinsic camera calibration for temporally consistent IPM using lane boundary observations with a lane width prior." arXiv preprint arXiv:2008.03722 (2020).

* cited by examiner

| Roll angle | 0.0 | 1.0 | 2.0 |
|---|---|---|---|
| Fitting result comparison |  |  |  |

METHOD AND APPARATUS FOR CALIBRATING ROLL ANGLE OF ON-BOARD CAMERA, DEVICE, AND STORAGE MEDIUM

RELATED APPLICATIONS

This application is a continuation of PCT Application No. PCT/CN2023/075618 filed on Feb. 13, 2023, which claims priority to Chinese Patent Application No. 202210311948.3, filed on Mar. 28, 2022, and entitled "METHOD AND APPARATUS FOR CALIBRATING ROLL ANGLE OF ON-BOARD CAMERA, DEVICE, AND STORAGE MEDIUM". The two applications are incorporated herein by reference in their entirety.

FIELD OF THE TECHNOLOGY

Embodiments of this application relate to the technical field of Internet of Vehicles, and in particular, to a method and an apparatus for calibrating a roll angle of an on-board camera, a device, and a storage medium.

BACKGROUND OF THE DISCLOSURE

Currently, a current road surface is photographed by an on-board camera, and a two-dimensional plane image of a lane line on the current road surface can be fitted by performing inverse perspective mapping (IPM) projection on a captured picture, which is widely used in map and navigation.

Often, if the lane line needs to be fitted, it is performed by the IPM projection on a single frame image, and a roll angle is calibrated based on a fitted lane line width. As such, the fitted lane line is kept as clear as possible.

However, the roll angle calibrated by using this method may be inaccurate.

SUMMARY

Embodiments of this application provide a method and an apparatus for calibrating a roll angle of an on-board camera, a device, and a storage medium. The technical solutions are as follows:

One aspect of this application provides a method for calibrating a roll angle of an on-board camera is provided. The method is performed by a computer device, and includes: obtaining an image frame sequence collected by the on-board camera while a vehicle is in motion, the image frame sequence comprising n image frames of a road captured by the on-board camera at n timestamps, n being an integer greater than 1; selecting a plurality of image groups from the image frame sequence, each of the image groups comprising a plurality of consecutive image frames in the image frame sequence; obtaining lane line images corresponding to the plurality of image groups at a target roll angle, to obtain a lane line image set corresponding to the target roll angle, the lane line image corresponding to each of the image groups at the target roll angle comprising at least one lane line obtained through fitting of lane line detection points extracted from a plurality of image frames in the image group at the target roll angle; and determining the roll angle of the on-board camera based on lane line image sets corresponding to different roll angles.

According to an aspect of the embodiments of this application, a computer device is provided, including a processor and a memory, the memory storing a computer program, and the computer program being loaded and executed by the processor to implement the above method for calibrating a roll angle of an on-board camera.

According to an aspect of the embodiments of this application, a non-transitory computer-readable storage medium is provided, storing a computer program, the computer program being loaded and executed by a processor to implement the above method for calibrating a roll angle of an on-board camera.

In embodiments consistent with the present disclosure, when determining the roll angle of the on-board camera, the plurality of image frames collected by the on-board camera is used as a reference basis, more reference data is provided in a process of determining the roll angle, which avoids an error of only considering a single frame of image, and helps to improve accuracy of the determined roll angle. In addition, this application adopts an idea of big data statistics. Through fitting of a plurality of lane line image sets corresponding to different roll angles, and determining the roll angle corresponding to the on-board camera based on the plurality of lane line image sets, accuracy of roll angle calibration is improved and the fitted lane line error is reduced.

DESCRIPTION OF EMBODIMENTS

To make the objectives, technical solutions, and advantages of this application clearer, the following further describes implementations of this application in detail with reference to the accompanying drawings.

Before embodiments of this application are introduced and described, terms related to this application are first defined and described.

Figure 1:
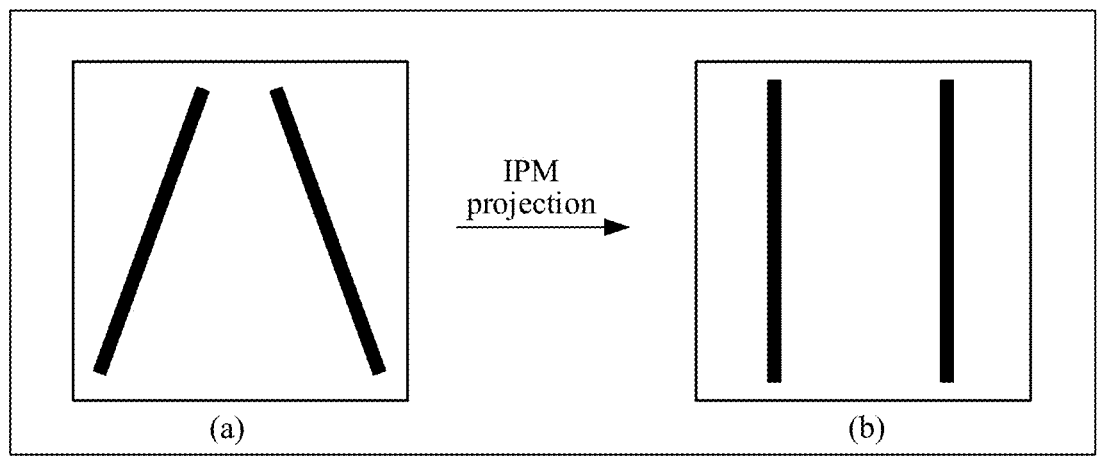
FIG. 1 is a schematic diagram of inverse perspective mapping (IPM) projection according to an embodiment of this application.

Inverse perspective mapping (IPM) projection: When an on-board camera mounted to a vehicle collects a lane line picture, an originally parallel road surface presents a certain angle (as shown in FIG. 1 (*a*)), and the lane line having a certain angle in the picture is restored to parallel (as shown in FIG. 1 (*b*)), which is referred to as the IPM projection.

Figure 2:
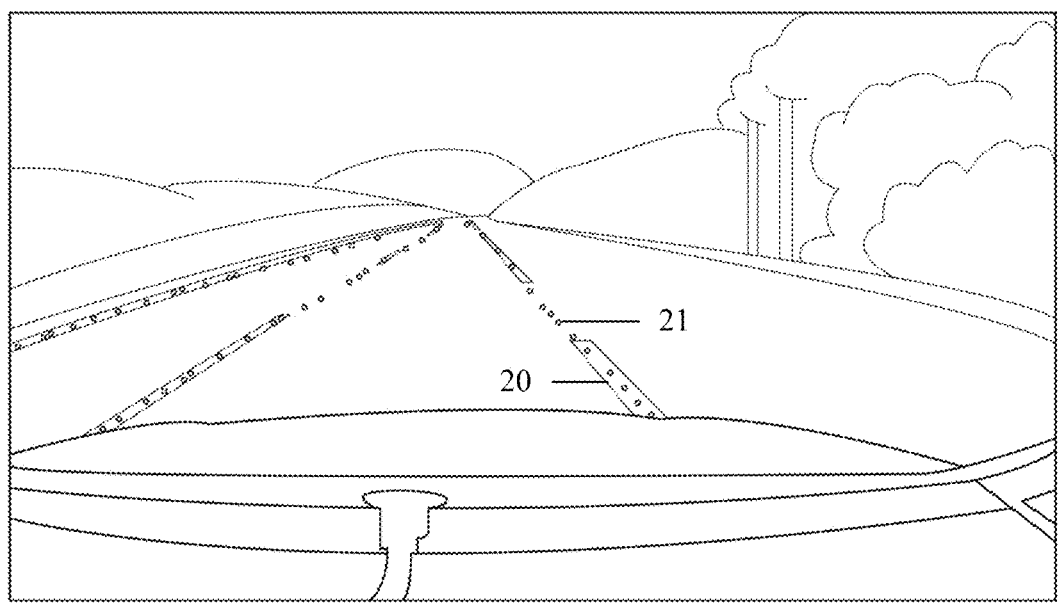
FIG. 2 is a schematic diagram of lane line detection points in an image frame according to an embodiment of this application.
Figure 3:
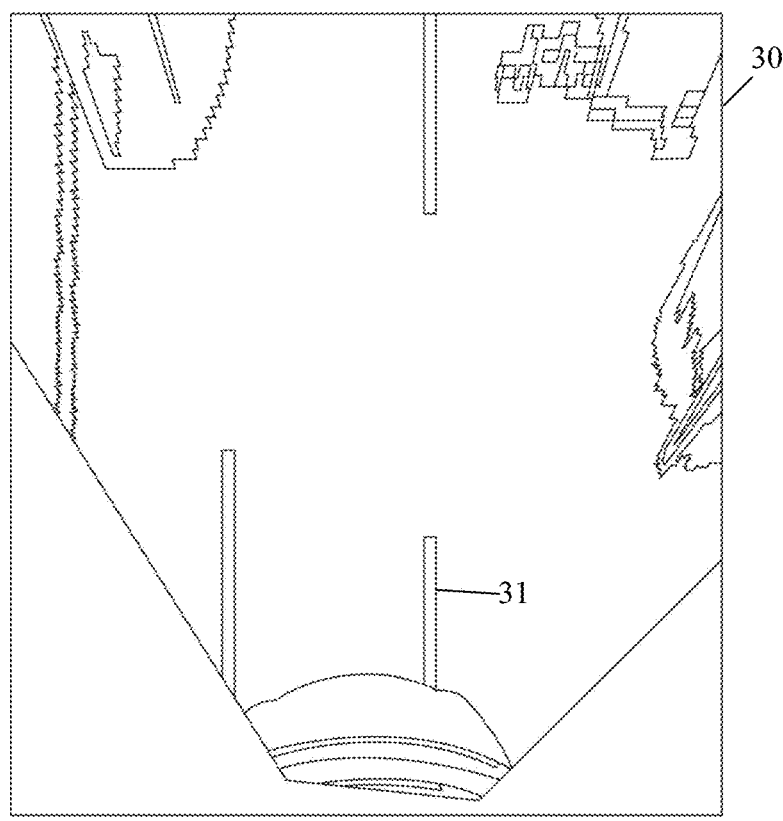
FIG. 3 is a schematic diagram of a lane line image fitted based on a lane line detection result according to an embodiment of this application.

Lane line detection model: It is a model configured to detect a lane line, and an output lane line detection point is obtained by inputting an image frame. In one embodiment, the lane line detection model based on a deep neural network (such as LaneNet) regards a lane line detection as an instance segmentation problem and solves an end-to-end problem, where the input is an image, and the output is a lane line detection point (or referred to as a "lane line pixel") coordinate and a lane line identification. After obtaining the information, an image is usually projected to a bird's-eye view to further improve lane line fitting. The lane line detection points obtained by the lane line detection model are shown in FIG. 2, where a series of points along lane line 20 are the lane line detection points 21. According to coordinates of the lane line detection points 21 shown in FIG. 2, the points are projected to the bird's-eye view according to the IPM projection, that is, a vehicle body coordinate system, and a lane line detection result is obtained. The lane line image 30 is fitted according to the lane line detection result, that is, as shown in FIG. 3, 31 is the fitted lane line, and the lane line under the bird's-eye view tends to be parallel.

Pitch angle: An angle of rotation of an on-board camera around a horizontal plane perpendicular to a direction of a vehicle speed is referred to as a pitch angle, which may be understood as an angle of "nod" of the on-board camera.

Yaw angle: An angle of rotation of an on-board camera in a direction of gravity is referred to as a yaw angle, which may be understood as an angle of "shaking a head" of the on-board camera.

Roll angle: An angle of rotation of an on-board camera around a speed direction of a vehicle is referred to as a roll angle, which may be understood as "roll" angle of the on-board camera.

Vehicle body coordinate system: It is a two-dimensional coordinate system perpendicular to the direction of gravity.

Figure 4:
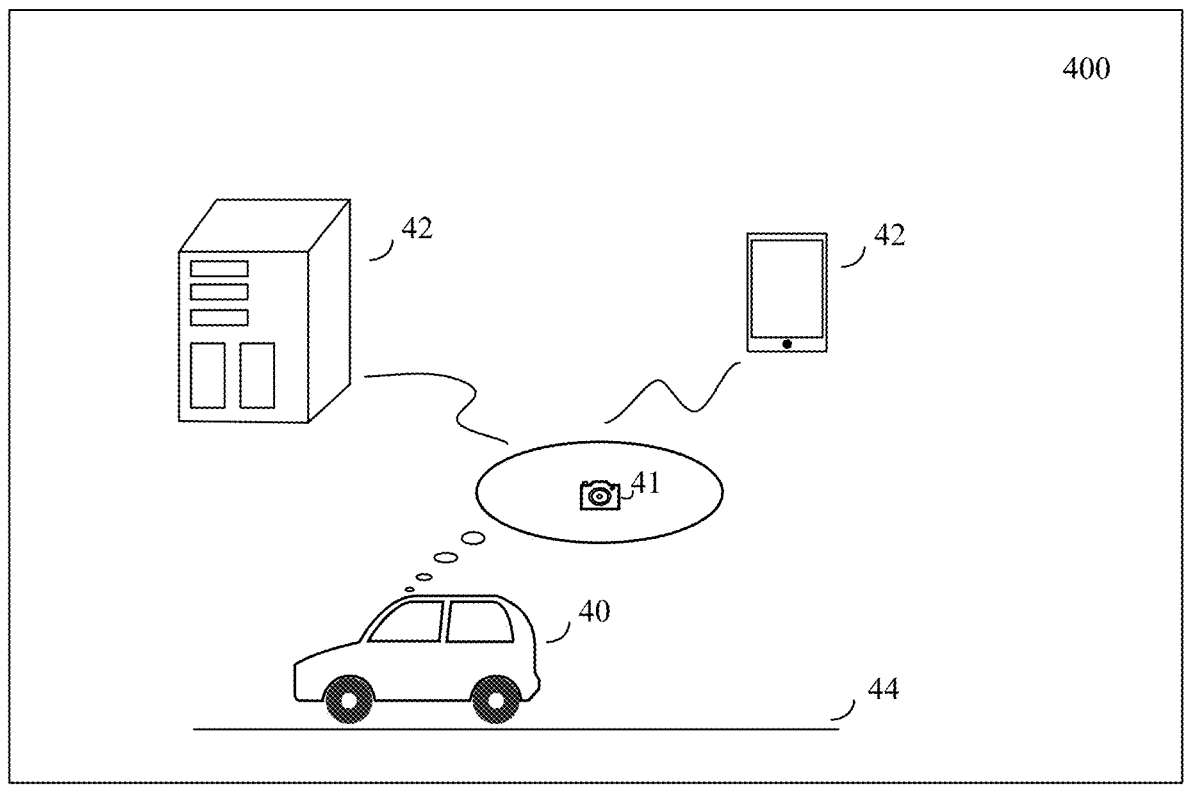
FIG. 4 is a schematic diagram of an implementation environment according to an embodiment of this application.

FIG. 4 is a schematic diagram of an implementation environment according to an embodiment of this application. The implementation environment 400 may include a vehicle 40, an on-board camera 41, and a computer device 42.

The on-board camera 41 is mounted to vehicle 40 and configured to photograph a lane line condition on a current road 44. The on-board camera 41 captures the lane line condition above the road 44, and feeds back the captured image to the computer device 42. The computer device 42 processes and analyzes the received image to obtain a calibrated roll angle, and continues to fit the lane line based on the calibrated roll angle.

The computer device 42 may be any electronic device with data computation and storage capabilities. For example, the computer device 42 may be a terminal device or a server. The terminal device may be a terminal device equipped in the vehicle 40, such as an on-board terminal device, an on-board camera, or may also be a terminal device that can communicate with the on-board camera 41, such as a smart phone, a tablet computer, a personal computer (PC), a smart wearable device, or the like, but is not limited thereto. The server may be an independent physical server, or may be a server cluster composed of a plurality of physical servers or a distributed system, or a cloud server providing a cloud computing service. The on-board camera 41 and the computer device 42 may be directly or indirectly connected through wired or wireless communication, which is not limited in this application. Embodiments of this application may be applicable to various scenarios, including but not limited to cloud technology, artificial intelligence, intelligent transportation, assisted driving, and the like.

The implementation environment provided in FIG. 4 is explanatory only. In addition to being applicable to the implementation environment, the technical solution of this application may also be applicable to another implementation environment or scenario with camera roll angle calibration or lane line detection requirement, which is not limited in this application.

Figure 5:
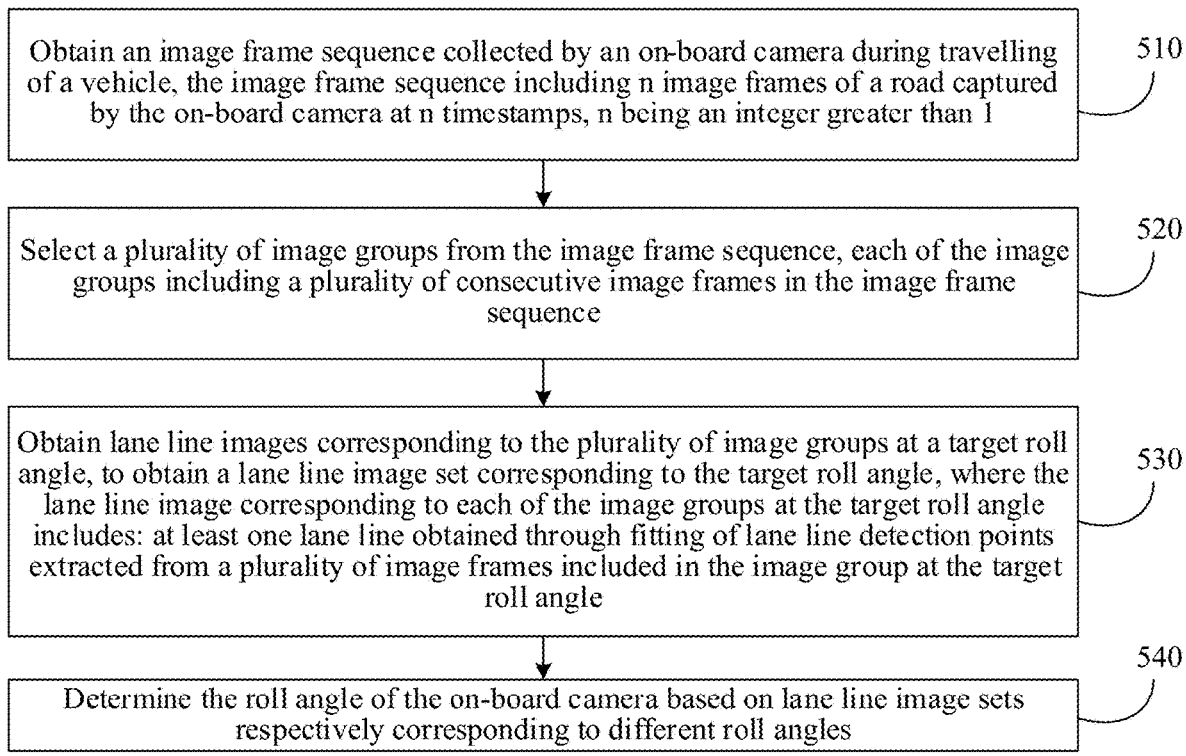
FIG. 5 is a flowchart of a method for calibrating a roll angle of an on-board camera according to an embodiment of this application.

FIG. 5 is a flowchart of a method for calibrating a roll angle of an on-board camera according to an embodiment of this application. The execution body of each step of the method may be the computer device 42 in the implementation environment shown in FIG. 4. In the following method embodiments, for ease of description, the steps are performed by a computer device, for example. The method may include at least one of the following steps (510 to 540).

Step 510: Obtain an image frame sequence collected by the on-board camera while a vehicle is in motion, the image frame sequence including n image frames of a road captured by the on-board camera at n timestamps, n being an integer greater than 1.

The on-board camera is a camera mounted to the vehicle. According to different mounting positions of the camera, the vehicle camera may be divided into four parts: front view, side view, rear view, and built-in; and according to a function application, the vehicle camera may be divided into three parts: driving assistance, parking assistance, and in-vehicle video. The on-board camera in embodiments of this application mainly refers to an on-board front view camera, which is configured to collect an image frame sequence during a driving process of the vehicle.

Timestamp: It is usually a sequence of characters that uniquely identifies a moment. A time interval between two adjacent timestamps is fixed or not fixed. In some embodiments, a time interval between two adjacent timestamps is a fixed 0.01 s. In some embodiments, a time interval between two adjacent timestamps is not fixed, and the time interval between two adjacent timestamps is randomly transformed from 0.01 s to 0.1 s.

Image frame: It is an image obtained by the on-board camera capturing the current lane condition, and an $m^{th}$ image frame is obtained by capturing a road at the $m^{th}$ timestamp, where m is an integer greater than 1 and less than or equal to n. The image frame reflects a current road condition corresponding to a certain timestamp.

Image frame sequence: It includes n image frames obtained by the on-board camera capturing the road at n timestamps, where n is an integer greater than 1. The n image frames are arranged based on the timestamp, forming one image frame sequence. In some embodiments, if n is 1000, the image frame sequence is 1000 image frames obtained by capturing the road with the on-board camera at 1000 timestamps.

The computer device obtains the image frame sequence collected by the on-board camera during travelling of the vehicle. The method of collection may be at least one of photography or video. In some embodiments, the computer device obtains n timestamps of the on-board camera to take pictures during the driving of the vehicle, and obtains n image frames respectively. In some embodiments, the computer device obtains image frames corresponding to n timestamps in the video of the on-board camera.

Step 520: Select a plurality of image groups from the image frame sequence, each of the image groups including a plurality of consecutive image frames in the image frame sequence.

Image group: It is a plurality of consecutive image frames selected in the image frame sequence. In some embodiments, an image group is 5 consecutive image frames in an image frame sequence. The quantity of image frames included in an image group may be set in combination with specific requirements, which is not limited in this application. The quantity of image groups included in different image groups may be the same or different.

The computer device selects a plurality of image groups from the image frame sequence, and each of the image groups includes a plurality of consecutive image frames in the image frame sequence. In some embodiments, a manner of selection is to select a plurality of image groups in a sliding window, where the sliding window is configured to include a plurality of image frames.

In some embodiments, the computer device moves a sliding window to a plurality of different positions in the image frame sequence to obtain the plurality of image groups, where a plurality of consecutive image frames included in the sliding window at each position corresponding to one image group. In some embodiments, each movement of the sliding window is spaced by 1 image frame. In some embodiments, each movement of the sliding window is spaced a plurality of image frames.

Figure 6:
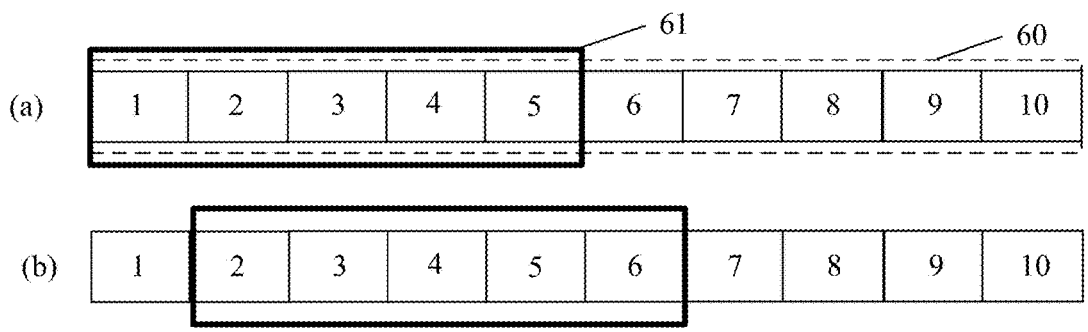
FIG. 6 is a schematic diagram of a sliding window according to an embodiment of this application.

In some embodiments, one sliding window includes 5 image frames, and each movement of the sliding window is spaced by 1 image frame. FIG. 6 shows a sliding window according to an embodiment of this application, where the image frame sequence is 60 and the sliding window is 61. As shown in FIG. 6 (a), the first timestamp selects an image group corresponding to the 5 image frames in a form of a sliding window, which are a first image frame to a fifth image frame (that is, the image frames labeled 1 to 5 in the figure); and As shown in FIG. 6 (b), the second timestamp selects an image group corresponding to the 5 image frames in a form of a sliding window, which are a second image frame to a sixth image frame (that is, the image frames labeled as 2 to 6 in the figure).

By controlling the moving interval of the sliding window, there is at least one identical image frame in the two adjacent sliding processes of the sliding window, which is helpful to improve use efficiency of the image frames in the image frame sequence. The sliding window is configured to determine a selection of the image group, which can ensure the quantity of image groups determined from the image frame sequence, and provide more reference data for the determination process of the roll angle.

Step 530: Obtain lane line images corresponding to the plurality of image groups at a target roll angle, to obtain a lane line image set corresponding to the target roll angle, the lane line image corresponding to each of the image groups at the target roll angle including: at least one lane line obtained through fitting of lane line detection points extracted from a plurality of image frames included in the image group at the target roll angle.

Target roll angle: It is any one of a plurality of roll angles. For each of the plurality of different roll angles in the roll angle, a processing method similar to the target roll angle may be used for obtaining the lane line image set corresponding to the roll angle, and then a plurality of lane line image sets corresponding to different roll angles are obtained. In some embodiments, the target roll angle includes, but is not limited to, at least one or more of −2.0, −1.5, −1.0, −0.5, 0.0, 0.5, 1.0, 1.5, and 2.0. In some embodiments, 5 roll angles exist, which are 0.0, 0.5, 1.0, 1.5, and 2.0 respectively. Based on the 5 roll angles, the lane line image set corresponding to the 5 roll angles are obtained respectively.

Figure 7:
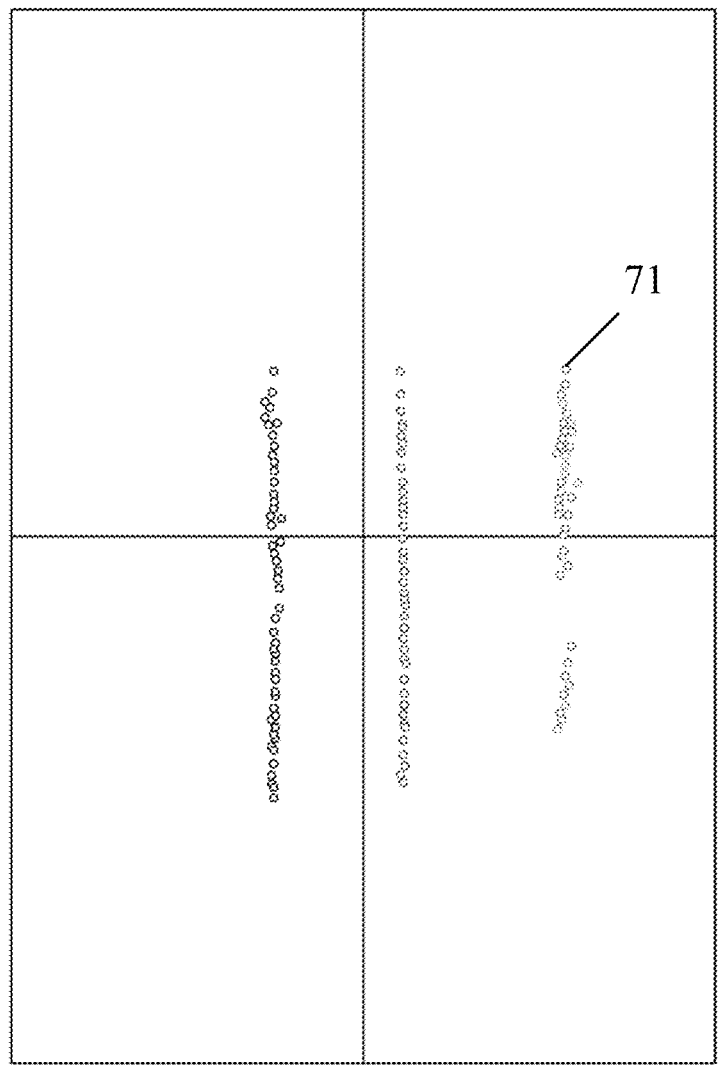
FIG. 7 is a schematic diagram of a lane line detection result according to an embodiment of this application.

Lane Line Image: A lane line image is obtained by projecting a plurality of image frames in an image group. In some embodiments, the lane line image in the vehicle body coordinate system is obtained by performing IPM projection on lane line detection points in the image frame. In some embodiments, the lane line image includes at least one lane line obtained through fitting of the lane line detection points extracted from each image frame included in the image group at the target roll angle. In some embodiments, the target roll angle is 2.0, and the lane line image includes two lane lines fitted for the lane line detection points extracted from a plurality of image frames included in the image group in response to that the target roll angle is 2.0. FIG. 7 shows a lane line detection result according to an embodiment of this application, including lane line detection points 71.

Lane line image set: It includes lane line images corresponding to a plurality of lane line images at the same roll angle form the lane line image set corresponding to the roll angle. Each roll angle corresponds to a lane line image set.

The computer device obtains lane line images corresponding to the plurality of image groups at a target roll angle, to obtain a lane line image set corresponding to the target roll angle. In some embodiments, the computer device fits the lane line detection points extracted from the plurality of image frames included in the image group to obtain a lane line image including at least one lane line. In some embodiments, the plurality of image frames are extracted by the lane line detection model to obtain lane line detection points respectively included in the plurality of image frames. In some embodiments, the lane line detection model is a LaneNet lane line detection model. In some embodiments, the lane line detection model may further be a model based on another structural component of a neural network, which is not limited herein in this application.

In some embodiments, the computer device fits the lane line detection points in a way of determining the corresponding lane detection result in the plurality of image frames through IPM projection firstly, and then fitting the lane detection result corresponding to the plurality of image frames by using a first-order function. In some embodiments, the computer device fits the lane line detection points in a way of determining the corresponding lane detection result in the plurality of image frames through IPM projection firstly, and then fitting the lane detection result corresponding to each of the determined plurality of image frames by using a second-order function.

In some embodiments, the target roll angle is 1.0, and the computer device extracts the 5 image frames included in the image group by using the LaneNet lane line detection model, to obtain a plurality of lane line detection points; and after obtaining the coordinates corresponding to the lane line detection points (that is, the lane detection result), the computer device fits the lane line detection result by using the first-order function, to obtain 5 lane line images including three lane lines. That is to say, the computer device obtains a lane line image set including the 5 lane line images.

Figure 8:
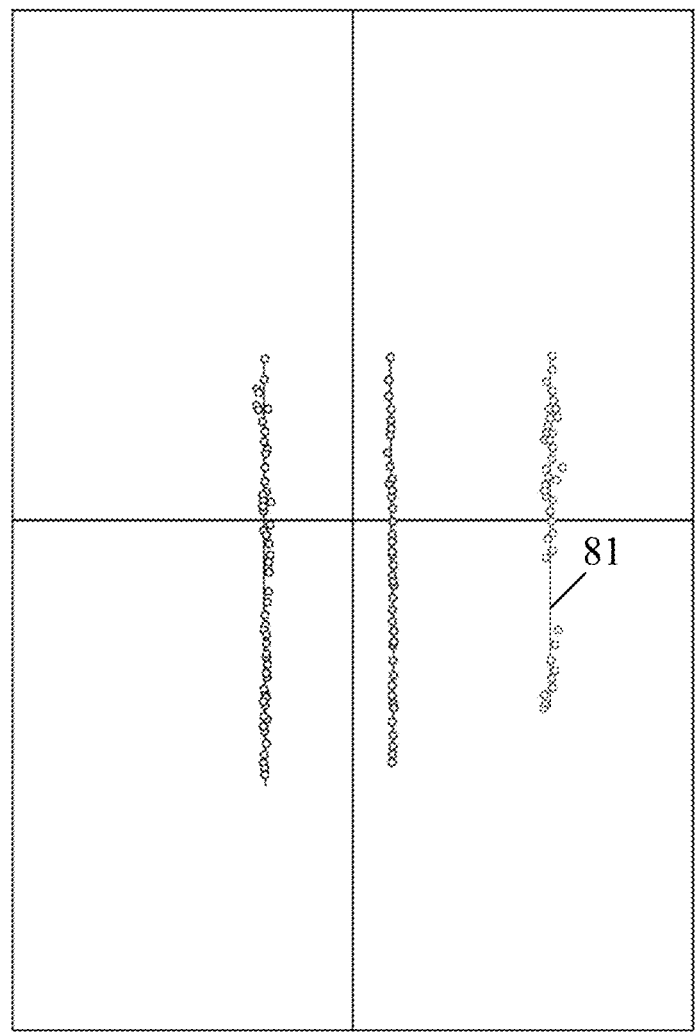
FIG. 8 is a schematic diagram of an effect of fitting a lane line detection result by using a first-order function according to an embodiment of this application.

FIG. 8 shows an effect of fitting a lane line detection result by using a first-order function according to an embodiment of this application. As shown in FIG. 8, it is not difficult to see that in the lane line image obtained through fitting of the first-order function, the distance between a straight line 81 fitted by the lane line detection result and the lane line detection result around the straight line 81 is small.

In some embodiments, the target roll angle is 2.0, and the computer device extracts the 5 image frames included in the image group by using the LaneNet lane line detection model, to obtain a plurality of lane line detection points. After obtaining coordinates of the lane line detection points, the computer device obtains the lane line detection result through the IPM projection, and fits the lane line detection result by using the second-order function, to obtain 5 lane line images containing four lane lines and obtain a lane line image set.

Figure 9:
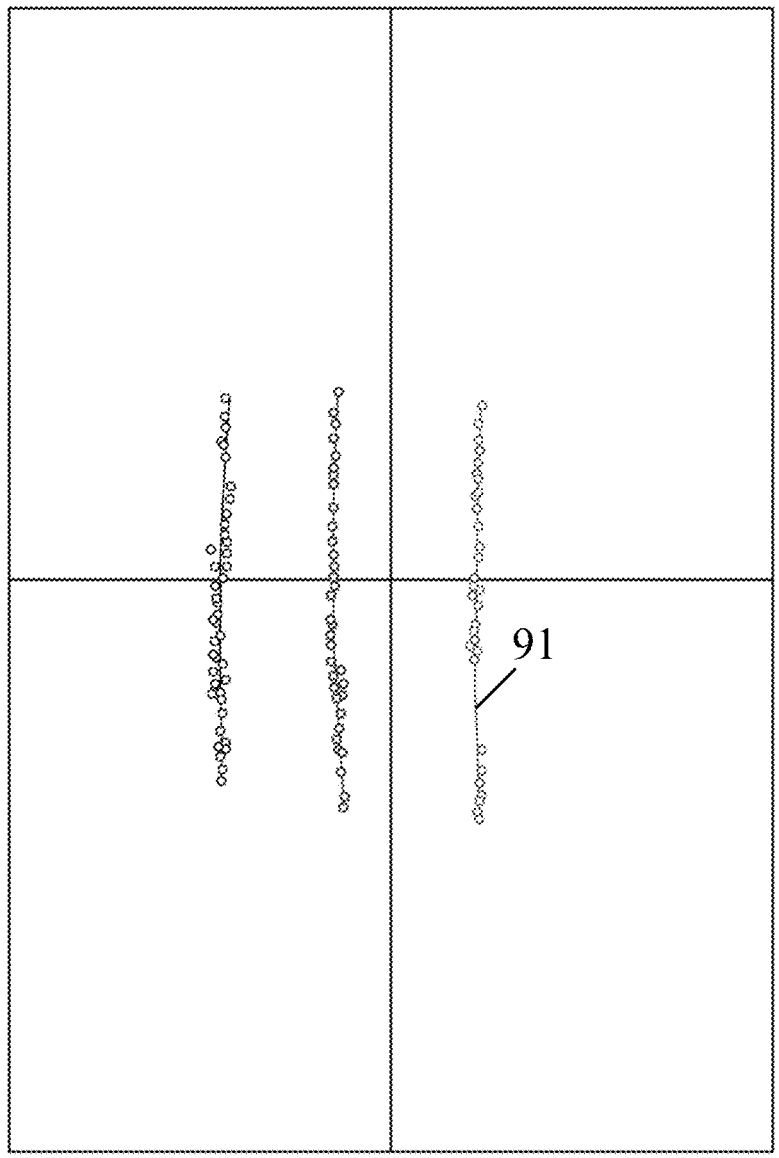
FIG. 9 is a schematic diagram of an effect of fitting a lane line detection result by using a second-order function according to an embodiment of this application.

FIG. 9 shows an effect of fitting a lane line detection result by using a second-order function according to an embodiment of this application. As shown in FIG. 9, it is not difficult to see that in a result of fitting with the second-order function, a distance between the lane line detection result from the fitted straight line 91 and the lane line detection result around the straight line 91 is large. The computer device deletes the lane line image in the lane line image set that meets a third condition, to obtain a screened lane line image set, where the third condition includes at least one of: a lane line fitting error is greater than or equal to a first threshold, and a quantity of the at least one lane line that is included is less than or equal to a second threshold.

Figure 10:
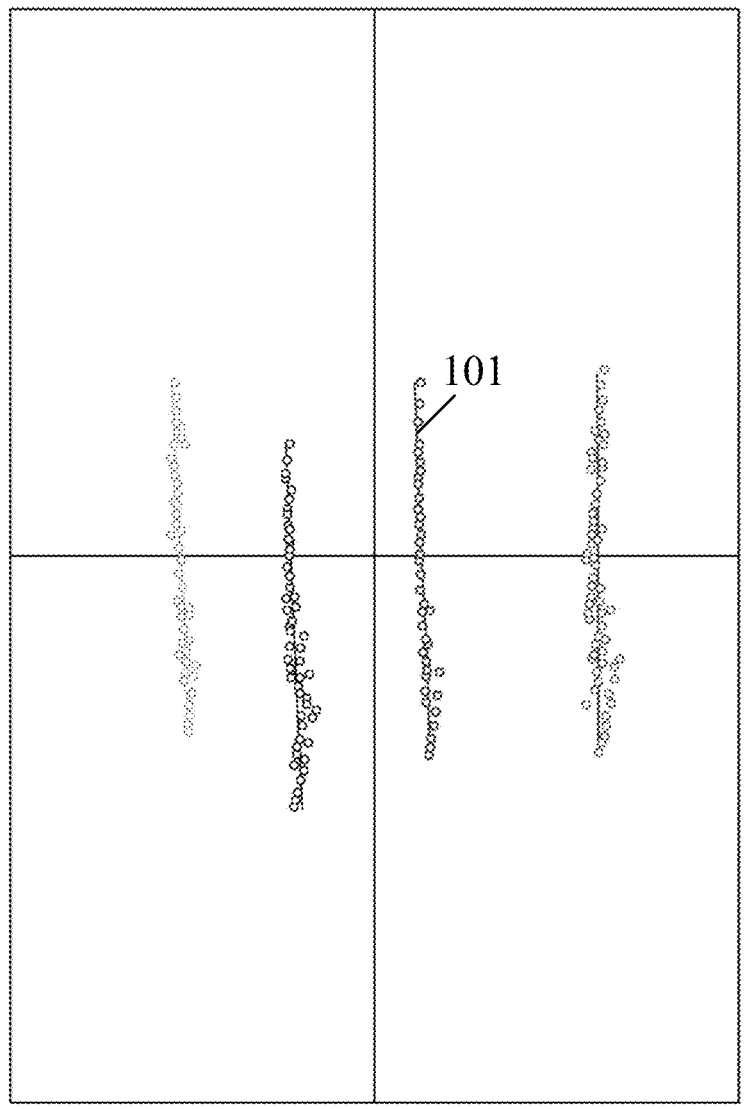
FIG. 10 is a schematic diagram of a lane line image after fitting a lane line detection result according to an embodiment of this application.

In some embodiments, the first threshold is A, where A is a positive number. In some embodiments, A is 0.5, and the computer device deletes a lane line image with a lane line fitting error greater than or equal to 0.5 in the lane line image set to obtain a screened lane line image set. FIG. 10 shows a lane line image after fitting a lane line detection result according to an embodiment of this application. It is not difficult to see a large distance exists between the lane line detection result in an area around a fitting line 101 and the fitting line 101. After calculating that the fitting error of fitting line 101 is greater than A, the lane line image shown in FIG. 10 is to be deleted. In some embodiments, 200 lane line images exist in the lane line image set, but the fitting error of 20 lane line images is greater than 0.5, and the fitting error of 20 lane line images is equal to 0.5. The computer device deletes the 40 lane line images from the lane line image set to obtain a screened lane line image set. The screened lane line image set includes 160 lane line images.

Figure 11:
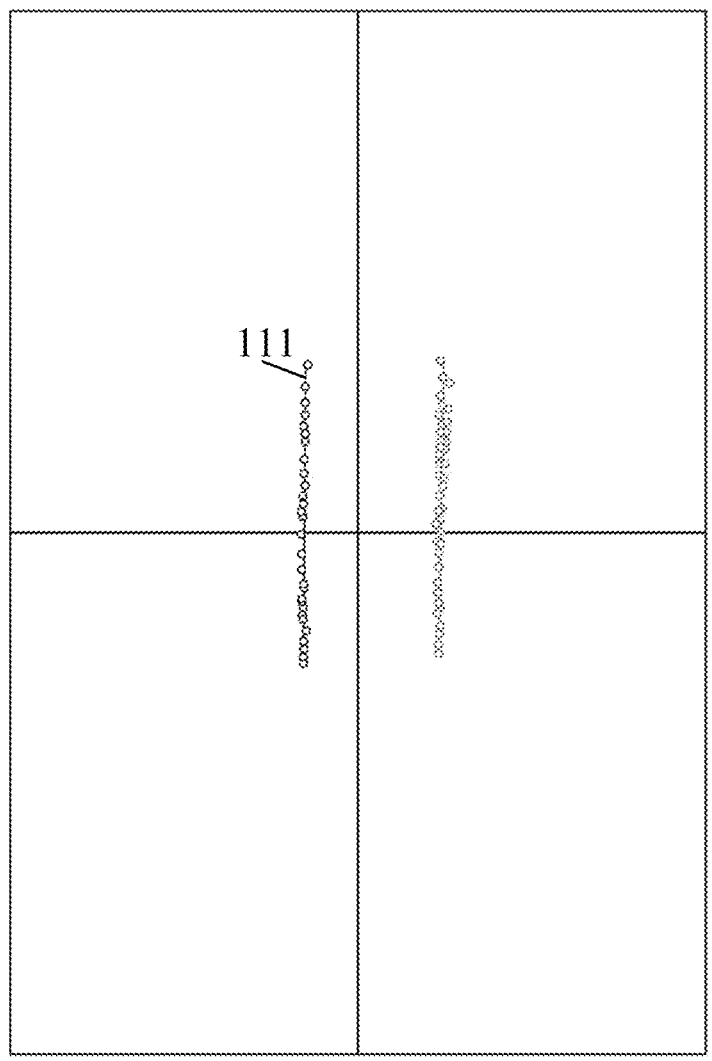
FIG. 11 is a schematic diagram of a lane line image after fitting a lane line detection result according to another embodiment of this application.

In some embodiments, the second threshold is B, where B is a positive integer. In some embodiments, B is 2. The computer device deletes the lane line images that include a quantity of lane lines less than or equal to 2 in the lane line image set, to obtain a screened lane line image set. FIG. 11 shows a lane line image after fitting a lane line detection result according to another embodiment of this application. It is not difficult to see that the quantity of lane lines 111 fitted in the lane line image is only 2, that is, the quantity of lane lines is equal to 2, and the lane line image shown in FIG. 11 is to be deleted. In some embodiments, 200 lane line images exist in the lane line image set. 10 lane line images include a quantity of lane lines less than 2, and 20 lane line images include a quantity of lane lines equal to 2. After deleting the 30 lane line images, a screened lane line image set is obtained, and the screened lane line image set includes 170 lane line images.

In some embodiments, the first threshold is A, where A is a positive number, and the second threshold is B, where B is a positive integer. In some embodiments, A is 0.5 and B is 2. The computer device deletes the lane line image having the lane line fitting error greater than or equal to 0.5, or including the lane line image with the quantity of lane lines less than or equal to 2, to obtain a screened lane line image set. In some embodiments, 200 lane line images exist in the lane line image set, and a total of 40 lane line images has a lane line fitting error greater than or equal to 0.5, including a total of 30 lane line images with a lane line quantity less than or equal to 2. 10 lane line images not only have a lane line fitting error greater than or equal to 0.5, but also include a quantity of lane lines less than or equal to 2. If the lane line image with the quantity of lane lines less than or equal to 2 does not overlap with the lane line image with the quantity of lane lines included less than or equal to 2, that is, a total of 60 lane line images satisfy that the lane line fitting error is greater than or equal to 0.5, or the quantity of lane lines included in the lane line image is less than or equal to 2, the computer device deletes the 60 lane line images from the lane line image set to obtain a screened lane line image set, and the screened lane line image set includes 140 lane line images.

Step 540: Determine a roll angle of the on-board camera based on lane line image sets respectively corresponding to different roll angles.

If the deleting step in step 530 is not performed, the lane line image set used is not screened in the process of determining the roll angle of the on-board camera based on the lane line image set corresponding to different roll angles by the computer device.

If the deleting step in step 530 is performed to screen the lane line images included in the lane line image set to obtain the screened lane line image set, the computer device determines the roll angle of the on-board camera based on screened lane line image sets respectively corresponding to the different roll angles. In some embodiments, the roll angle is 2.0, and the screened lane line image set corresponding to the roll angle of 2.0 includes 30 lane line images. In some embodiments, the roll angle is 1.0, and the screened lane line image set corresponding to the roll angle of 1.0 includes 100 lane line images.

By the above method, the lane line images that meet the third condition in the lane line image set are deleted, and a total amount of lane line images included in the lane line image set is reduced, which helps to shorten a processing time for determining the roll angle. In addition, the above method can remove an obviously unqualified lane line image, which helps to improve calibration accuracy of the roll angle determined by the lane line image.

The computer device counts a quantity of lane line images in the lane line image set corresponding to each of the roll angles that meet a first condition, where the first condition is set based on a distance between adjacent lane lines in the lane line image; and the computer device determines the roll angle corresponding to the lane line image set in which the quantity of lane line images meets a second condition as the roll angle of the on-board camera.

In some embodiments, the first condition is that a difference between a maximum spacing and a minimum spacing between adjacent lane lines in the lane line image is less than or equal to a threshold. The second condition is that the quantity of lane line images satisfying the first condition is of maximum value. In some embodiments, a threshold is 30 cm. That is to say, the computer device counts the quantity of lane line images corresponding to each roll angle in the lane line image set, and the difference between the maximum spacing and the minimum spacing of adjacent lane lines is less than or equal to 30 cm. The computer device determines the roll angle corresponding to the lane line image set with the largest quantity of lane line images satisfying the first condition as the roll angle of the on-board camera.

In some embodiments, in a lane line image set corresponding to a roll angle of 1.2, a quantity of lane line images that meet the difference between the maximum spacing and the minimum spacing of adjacent lane lines is less than or equal to 30 cm is 120. In the lane line image set corresponding to another roll angle, a quantity of lane line images in which a difference between the maximum spacing and the minimum spacing of adjacent lane lines in the lane line images is less than or equal to 30 cm is less than 120. That is to say, 120 is the maximum value of the quantity of lane line images satisfying the first condition, and 1.2 is determined as the roll angle of the on-board camera.

Through the first condition and the second condition, a lane line image set with an optimal fitting result is determined, and q roll angle corresponding to the lane line image set is determined as the roll angle of the on-board camera. The roll angle is determined by statistical means, on the one hand, computing resource consumed in the roll angle determination process is reduced, and a computation overhead is reduced. On the other hand, accuracy of the determined roll angle is improved.

Figure 12:
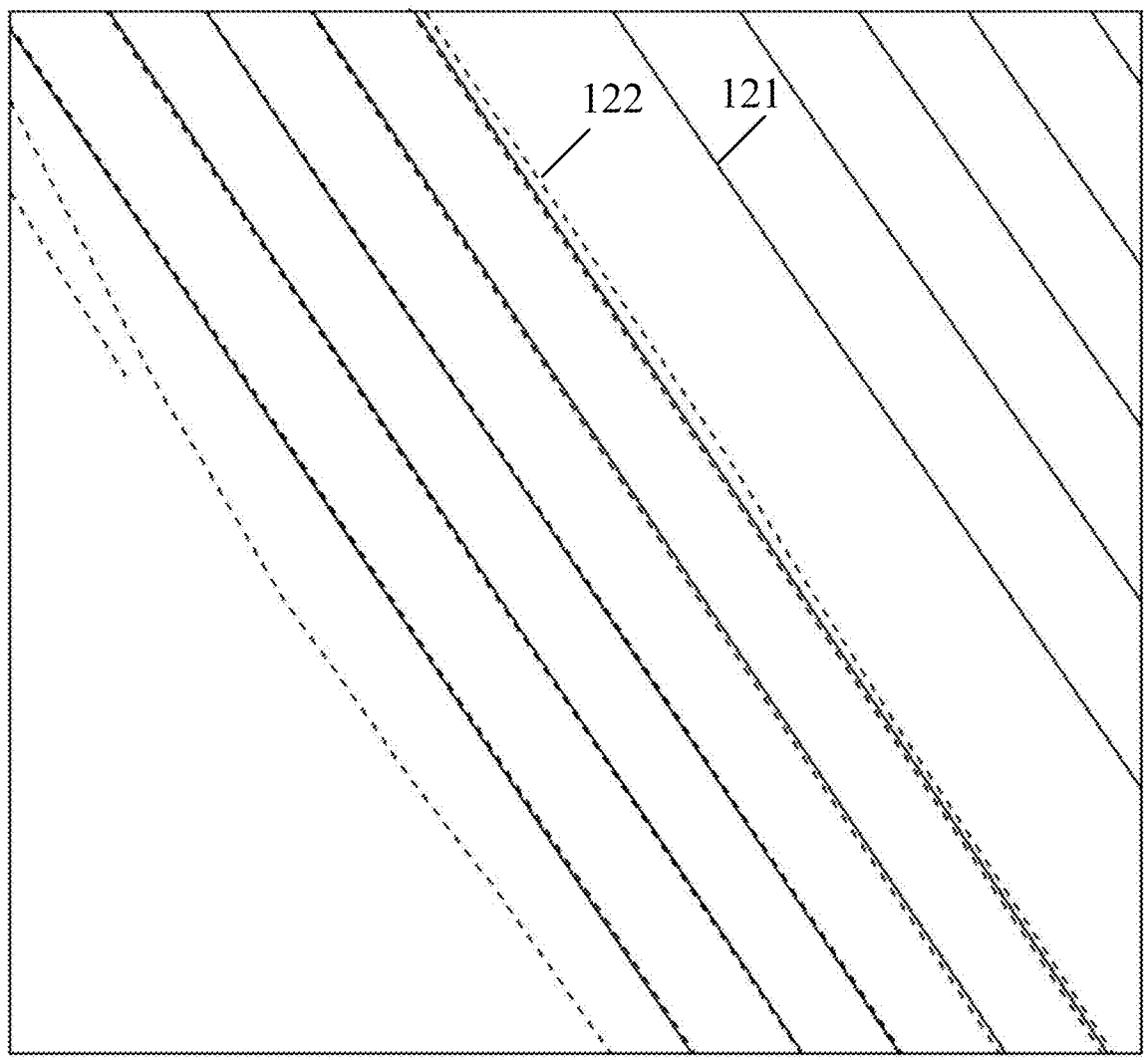
FIG. 12 is a schematic diagram of a lane line image corresponding to a determined roll angle according to an embodiment of this application.

FIG. 12 shows a lane line image corresponding to a determined roll angle according to an embodiment of this application. As shown in FIG. 12, a solid line 121 represents a lane line consistent with a road, and a dashed line 122 is a lane line fitted when the roll angle is 1.2. It can be seen that there is substantially no deviation between the dashed line 122 and the solid line 121.

Figure 13:
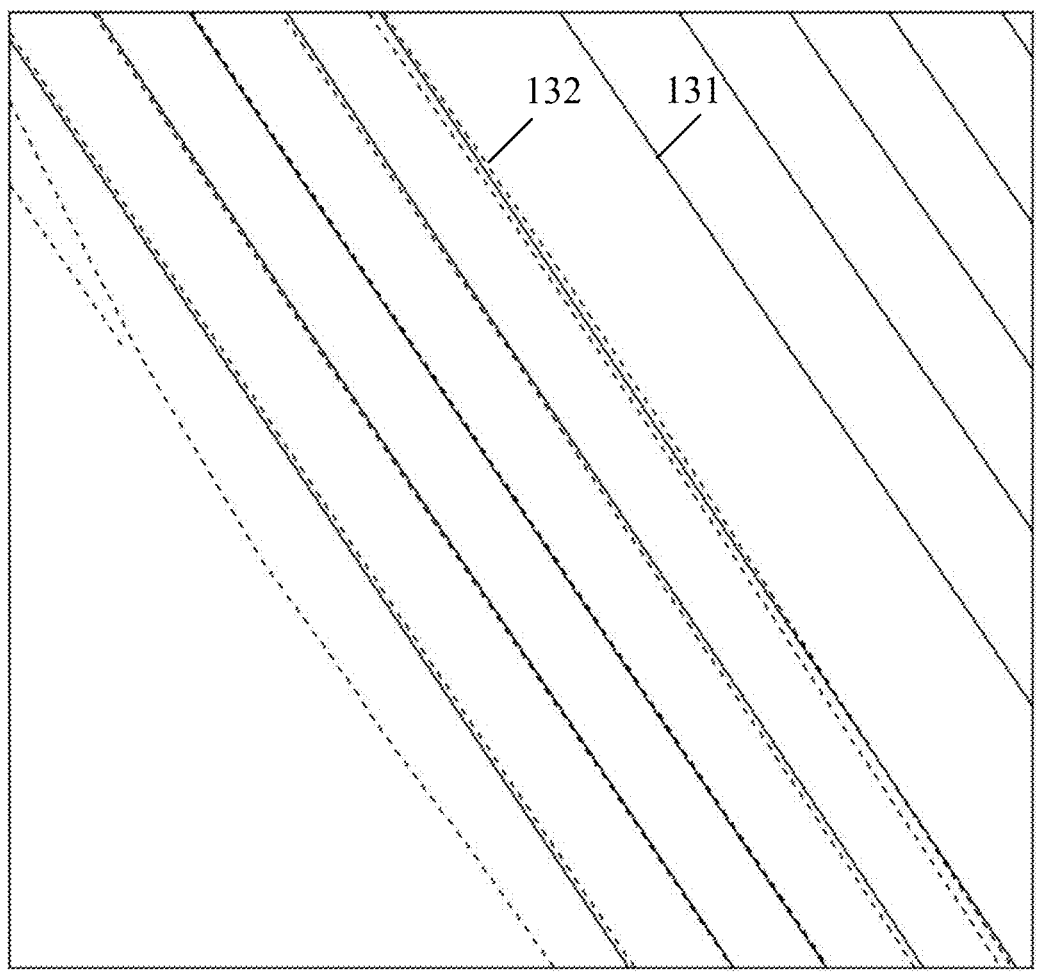
FIG. 13 is a schematic diagram of a lane line image corresponding to a roll angle of 1.0 according to an embodiment of this application.

FIG. 13 shows a lane line image corresponding to a roll angle of 1.0 according to an embodiment of this application. As shown in FIG. 13, a solid line 131 represents a lane line consistent with a road, and a dashed line 132 is a lane line fitted when the roll angle is 1.0. It can be seen that a deviation exists between the dashed line 132 and the solid line 131, which is slightly greater than the deviation in FIG. 12.

Figure 14:
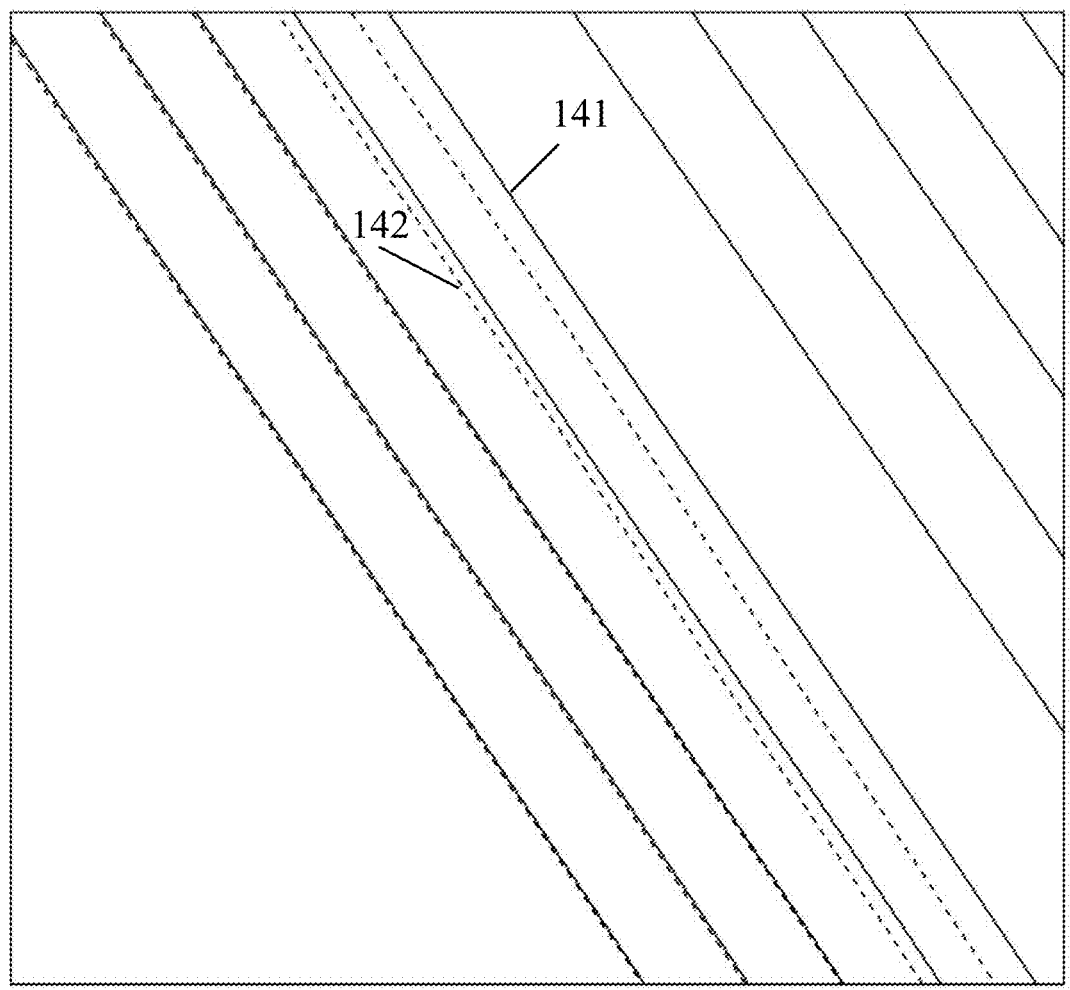
FIG. 14 is a schematic diagram of a lane line image corresponding to a roll angle of 0.0 according to an embodiment of this application.

FIG. 14 shows a lane line image corresponding to a roll angle of 0.0 according to an embodiment of this application. As shown in FIG. 14, a solid line 141 represents a lane line consistent with the road, and a dashed line 142 is a lane line fitted when the roll angle is an initial roll angle of 0.0. It can be seen that the deviation between the dotted line 142 and the solid line 141 is large.

Figure 24:
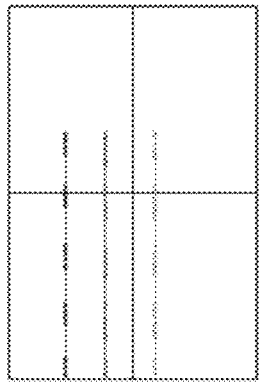
FIG. 24 is a diagram showing a comparison of the roll angle to the lane line fitting result according to an embodiment of this application.
Figure 24:
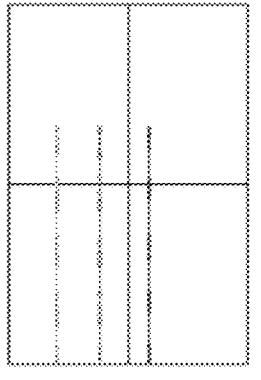
Figure 24:
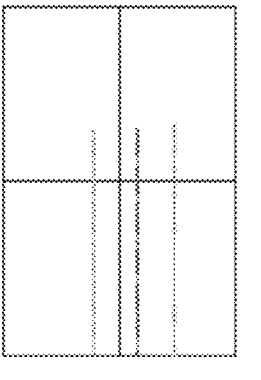

FIG. 24 shows a comparison of the roll angle to the lane line fitting result. When the roll angle is 0.0, the difference between the maximum spacing and the minimum spacing of adjacent lane lines in the lane line image is large; when the roll angle is 1.0, the difference between the maximum spacing and the minimum spacing of adjacent lane lines in the lane line image is small; and when the roll angle is 1.0, the difference between the maximum spacing and the minimum spacing of adjacent lane lines in the lane line image is large, which represents that the roll angle affects the difference between the maximum spacing and the minimum spacing of adjacent lane lines in the lane line image.

Figure 15:
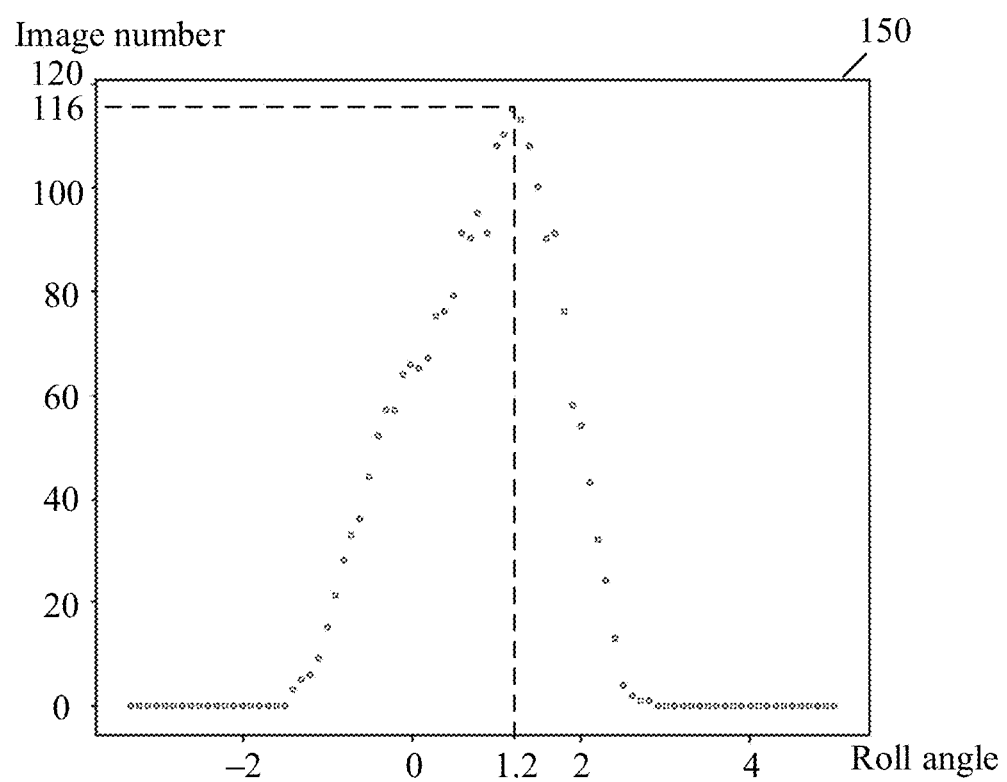
FIG. 15 is a schematic diagram of a relationship between a target roll angle and a quantity of lane line images according to an embodiment of this application.

FIG. 15 shows a relationship between a target roll angle and a quantity of lane line images according to an embodiment of this application. In the figure, the abscissa represents the roll angle, and the ordinate represents the quantity of lane line images in which the difference between the maximum spacing and the minimum spacing of adjacent lane lines in the lane line image set is less than or equal to 30 cm. A curve 150 shows a Gaussian distribution as a whole, and the quantity of lane line images satisfying the first condition increases with an increase of the roll angle, and decreases with an increase of the roll angle. There is a maximum value of the quantity of lane line images satisfying the first condition in a middle of the curve 150, and the roll angle corresponding to the maximum value of the quantity of lane line images satisfying the first condition is the roll angle that requires to be determined in the embodiment of this application, that is, the optimal roll angle. When the roll angle is 1.2, the quantity of lane line images is the largest, and the quantity is 116, therefore the determined roll angle is 1.2. Since the distribution of a plurality of candidate roll angles is discrete in the process of determining the roll angle, in the embodiment of this application, the determined roll angle may be one or a plurality of eligible ones.

In some embodiments, the roll angle of the on-board camera is applicable to a navigation map to determine the lane in which the vehicle is located, and perform a navigation prompt or automatic driving control based on the lane in which the vehicle is located. For example, based on the roll angle of the on-board camera finally determined, the IPM projection is performed on the image frame collected by the on-board camera during the driving process of the vehicle to obtain the corresponding lane line image. Then, based on the lane line image generated by the projection, a curvature of the corresponding road or lane is matched from the navigation map, and the navigation prompt or the automatic driving control such as turning are performed based on the curvature. For example, the navigation map can be a high-precision map.

After determining the roll angle of the on-board camera having high accuracy, the roll angle of the on-board camera is applicable to the navigation map, which helps the navigation map to generate a more accurate lane line image. Combined with the curvature of the lane, reducing the navigation prompt error caused by an inaccurate generated lane line image helps to improve accuracy of navigation.

In the technical solution provided by embodiments of this application, when determining the roll angle of the on-board camera, the computer device uses the plurality of image frames collected by the on-board camera as a reference, which avoids an error of only considering a single frame of image, and helps to improve accuracy of a final determined roll angle. In addition, this application adopts an idea of big data statistics. Through fitting of a plurality of lane line image sets corresponding to different roll angles, the roll angle corresponding to the lane line image set with the overall optimal fitting result is selected as the final roll angle corresponding to the on-board camera, which reduces the fitted lane line error and improves accuracy of the roll angle calibration.

In addition, by deleting the lane line images that meet the third condition from the lane line image set, the screened lane line image set can be obtained, which can speed up a subsequent processing speed and further improve accuracy of the roll angle calibration. By selecting a plurality of image groups from the image frame sequence through a manner of the sliding window, the plurality of image frames can be selected at one time. The IPM projection and fitting based on the plurality of image frames helps to reduce the fitting error and result in a relatively small error.

Figure 16:
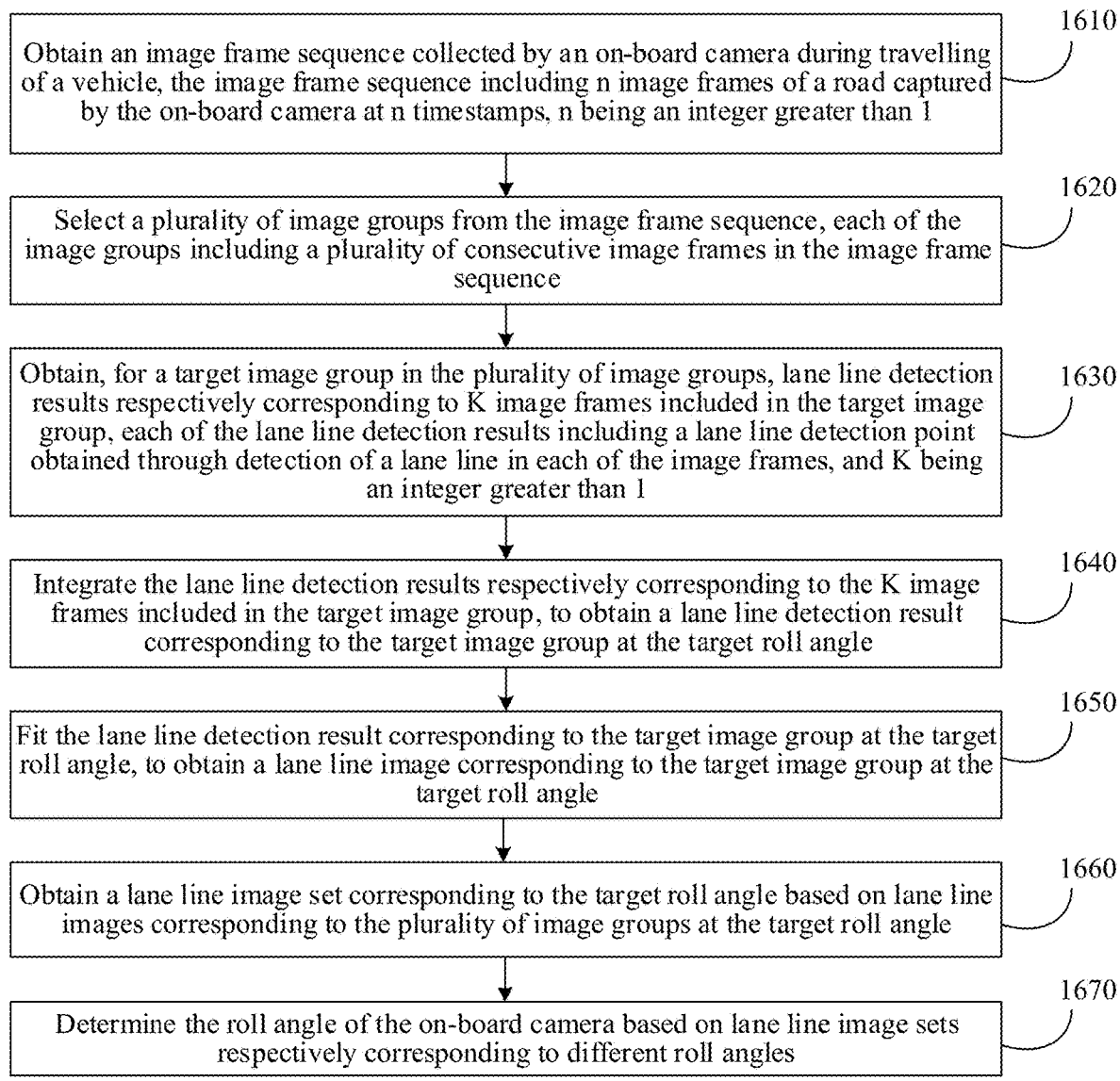
FIG. 16 is a flowchart of a method for calibrating a roll angle of an on-board camera according to another embodiment of this application.

FIG. 16 is a flowchart of a method for calibrating a roll angle of an on-board camera according to another embodiment of this application. The execution body of each step of the method may be the computer device 42 in the implementation environment shown in FIG. 4. In the following method embodiments, for ease of description, the steps are performed by a computer device, for example. The method may include at least one of the following steps (1610 to 1670).

Step 1610: Obtain an image frame sequence collected by the on-board camera while a vehicle is in motion, the image frame sequence including n image frames of a road captured by the on-board camera at n timestamps, n being an integer greater than 1.

Step 1620: Select a plurality of image groups from the image frame sequence, each of the image groups including a plurality of consecutive image frames in the image frame sequence.

Step 1630: Obtain, for a target image group in the plurality of image groups, lane line detection results respectively corresponding to K image frames included in the target image group, each of the lane line detection results including a lane line detection point obtained through detection of a lane line in each of the image frames, and K being an integer greater than 1.

In some embodiments, K is 5. In some embodiments, for the target image group in the plurality of image groups, the lane line detection results corresponding to the 5 image frames included in the target image group are obtained respectively. Certainly, K may also be another positive integer, which is not limited in this application.

Step 1640: Integrate the lane line detection results respectively corresponding to the K image frames included in the target image group, to obtain a lane line detection result corresponding to the target image group at the target roll angle.

In some embodiments, the integration extracts the lane line detection points in K image frames, and performs IPM projection to obtain the projected result, and the projection result of K image frames are superimposed together to obtain a lane line detection result corresponding to the target image group at the target roll angle.

The plurality of image frames are used in the roll angle determination process. On the one hand, compared to the related technology of using a single frame image to determine the roll angle, an influence of the single frame image shooting environment is reduced. By providing more reference data, accuracy of the determined roll angle can be improved. On the other hand, compared with the related technology of image segmentation to determine the roll angle, statistics are performed on the lane line image set generated from the plurality of image frames, which reduces computation in the process of determining the roll angle and helps to speed up the speed of determination of the roll angle.

In some embodiments, the computer device processes an $i^{th}$ image frame of the K image frames included in the target image group by using a lane line detection model, to obtain the lane line detection result corresponding to the $i^{th}$ image frame, where the lane line detection model is an artificial intelligence (AI) model configured to extract the lane line detection points. In some embodiments, the lane line detection model is a LaneNet lane line detection model.

In some embodiments, K is 5, the computer device processes an $i^{th}$ image frame of the 5 image frames included in the target image group by using a LaneNet lane line detection model, to obtain the lane line detection result corresponding to the $i^{th}$ image frame, where i is a positive integer less than or equal to 5.

The lane line detection model is configured to determine the lane line detection points in the image frame, which has low manual dependence, a speed of determining the lane line detection point is fast, and time of determining the roll angle is facilitated to shorten.

Step 1650: Fit the lane line detection result corresponding to the target image group at the target roll angle, to obtain a lane line image corresponding to the target image group at the target roll angle.

In some embodiments, the lane line detection result corresponding to the target image group at the target roll angle is fitted by using a first-order function, to obtain a first fitting result and determine a fitting error corresponding to the first-order function; the lane line detection result corresponding to the target image group at the target roll angle is fitted by using a second-order function, to obtain a second fitting result and determine a fitting error corresponding to the second-order function; the first fitting result is determined as a lane line image corresponding to the target image group at the target roll angle if the fitting error corresponding to the first-order function is less than the fitting error corresponding to the second-order function; and the second fitting result is determined as a lane line image corresponding to the target image group at the target roll angle if the fitting error corresponding to the first-order function is greater than the fitting error corresponding to the second-order function.

In some embodiments, the "fitting error corresponding to the first-order function" in the above embodiment is referred to as "the fitting error corresponding to the first fitting result", and the "fitting error of the second-order function" is referred to as "the fitting error corresponding to the second fitting result".

In some embodiments, as shown in FIG. 8, the computer device fits a lane line detection result by using a first-order function, where the first-order function is $y_i = a_0 + a_1 x_i$, $y_i$ represents an ordinate of an $i^{th}$ lane line detection result, $x_i$ represents an abscissa of the $i^{th}$ lane line detection result, $a_0$ represents a fitting constant, and $a_1$ represents a first-order fitting coefficient. The computer device calculates the fitting error B of the first-order function according to the lane line image obtained by using the first-order function.

As shown in FIG. 9, the computer device fits a lane line detection result by using a second-order function, where the second-order function is $y_i=a_0+a_1x_i+a_2x_i^2$, $y_i$ represents an ordinate of an $i^{th}$ lane line detection result, $x_i$ represents an abscissa of the $i^{th}$ lane line detection result, $a_0$ represents a fitting constant, $a_1$ represents a first-order fitting coefficient, and $a_2$ represents a second-order fitting coefficient. The computer device calculates the fitting error corresponding to the second-order function $$e = \frac{1}{n}\sum\nolimits_{i=1}(y_i - a_0 - a_1x_i - a_2x_i^2)^2$$

is C. B is greater than C, which represents that the computer device fits the lane line detection result by using the first-order function, and the obtained fitting error is large. The computer device selects the second-order function to fit the lane line detection result.

The first-order function and the second-order function are used for fitting a plurality of lane line detection results, and the fitting results corresponding to the fitting manner having less fitting error are determined as the lane line images. This method helps to improve accuracy of the fitted lane line, thereby improving accuracy of the determined roll angle.

Step 1660: Obtain a lane line image set corresponding to the target roll angle based on lane line images corresponding to the plurality of image groups at the target roll angle.

Step 1670: Determine the roll angle of the on-board camera based on lane line image sets respectively corresponding to different roll angles.

In embodiments consistent with the present disclosure, for the $i^{th}$ image frame of the K image frames included in the target image group, the $i^{th}$ image frame is processed by using the lane line detection model, which can obtain the lane line detection point more quickly, is convenient for subsequent IPM projection operation on the coordinates of the lane line detection point, and speeds up the processing speed. In addition, different fitting manners are used for fitting the lane line detection result, and the fitting manner having a small fitting error is selected to determine the lane line image, which is helpful to reduce the fitting error and improve accuracy of the determined roll angle.

Figure 17:
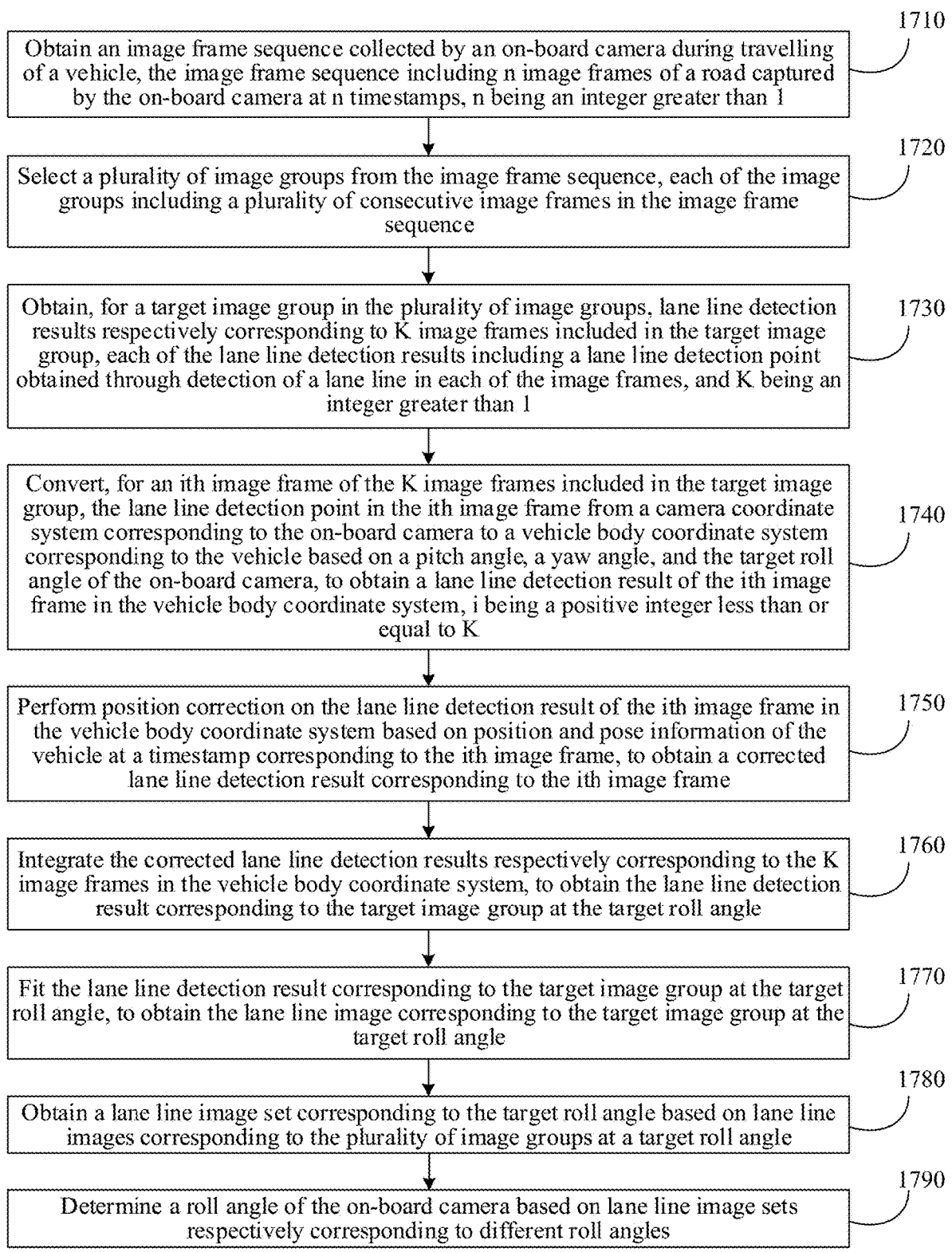
FIG. 17 is a flowchart of a method for calibrating a roll angle of an on-board camera according to another embodiment of this application.

FIG. 17 is a flowchart of a method for calibrating a roll angle of an on-board camera according to another embodiment of this application. The execution body of each step of the method may be the computer device 42 in the implementation environment shown in FIG. 4. In the following method embodiments, for ease of description, the steps are performed by a computer device, for example. The method may include at least one of the following steps (1710 to 1790).

Step 1710: Obtain an image frame sequence collected by the on-board camera while a vehicle is in motion, the image frame sequence including n image frames of a road captured by the on-board camera at n timestamps, n being an integer greater than 1.

Step 1720: Select a plurality of image groups from the image frame sequence, each of the image groups including a plurality of consecutive image frames in the image frame sequence.

Step 1730: Obtain, for a target image group in the plurality of image groups, lane line detection results respectively corresponding to K image frames included in the target image group, each of the lane line detection results including a lane line detection point obtained through detection of a lane line in each of the image frames, and K being an integer greater than 1.

Step 1740: Convert, for an $i^{th}$ image frame of the K image frames included in the target image group, the lane line detection point in the $i^{th}$ image frame from a camera coordinate system corresponding to the on-board camera to a vehicle body coordinate system corresponding to the vehicle based on a pitch angle, a yaw angle, and the target roll angle of the on-board camera, to obtain a lane line detection result of the $i^{th}$ image frame in the vehicle body coordinate system, i being a positive integer less than or equal to K.

In some embodiments, the computer device obtains a pitch angle and a yaw angle of the on-board camera, where the pitch angle and the yaw angle being obtained through IPM projection based on a parallel relationship of the lane lines.

Figure 18:
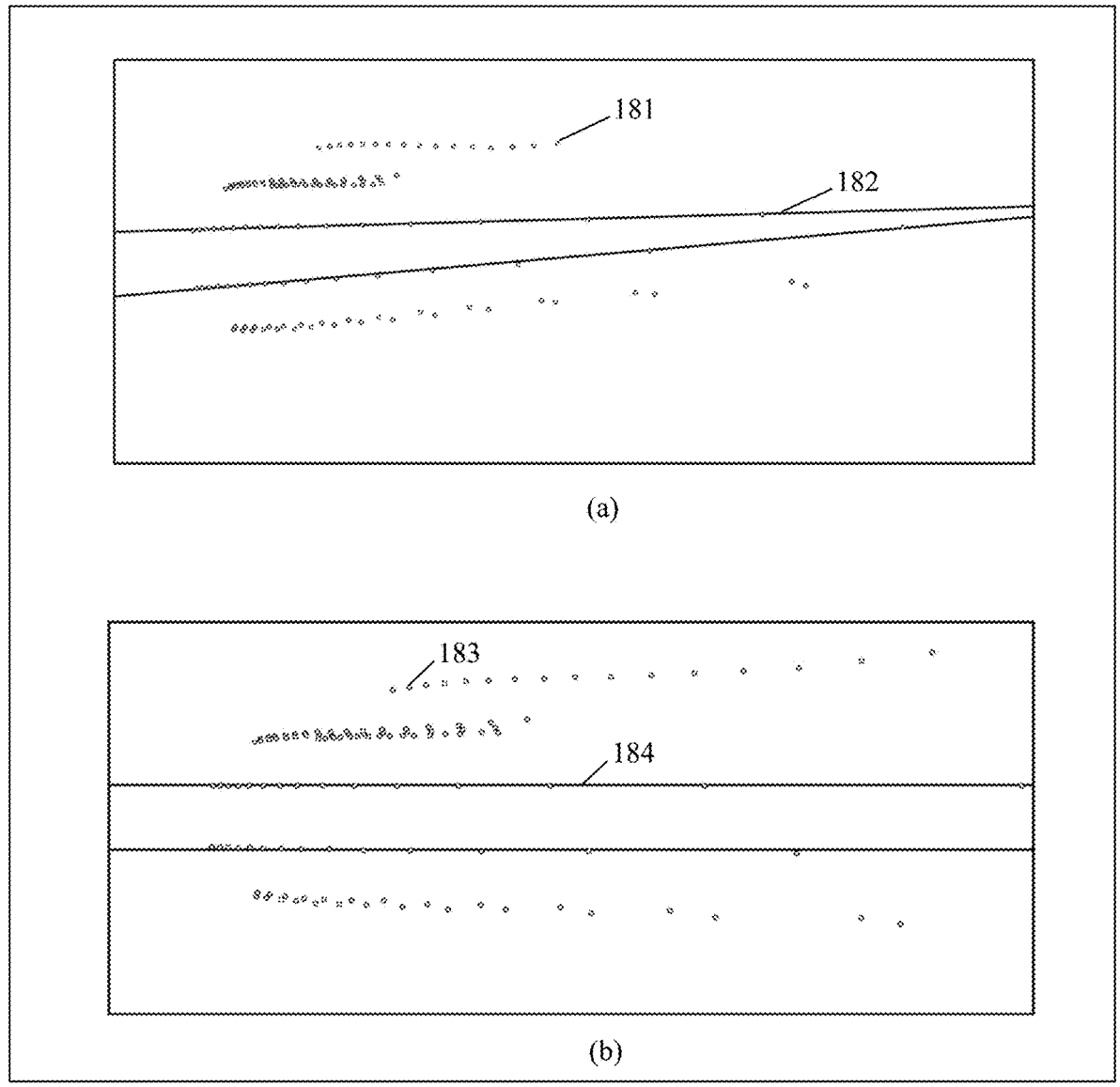
FIG. 18 is a schematic diagram of a lane line image according to an embodiment of this application.

FIG. 18 shows a lane line image according to an embodiment of this application. (a) in FIG. 18 is a lane line image based on an initial pitch angle and a yaw angle, and is a lane line image obtained from a lane line detection result 181 of the lane line detection points in the image frame. It is not difficult to find that the fitted lane lines 182 are not parallel, where the initial pitch angle and the yaw angle are both 0. By continuously adjusting the pitch angle and the yaw angle of the on-board camera, the IPM projection is performed on the lane line detection points of the image frame according to the adjusted pitch angle and yaw angle, and the lane lines fitted by the projected lane line detection result 181 are parallel. (b) in FIG. 18 is a lane line image based on the adjusted pitch angle and yaw angle. In response to that the lane line 184 fitted from the lane line detection result 183 is parallel, the pitch angle and the yaw angle are recorded. The pitch angle and the yaw angle used in embodiments of this application are the pitch angle and the yaw angle in response to that the fitted lane lines are parallel.

The initial pitch angle and the initial yaw angle are fitted, and the pitch angle and the yaw angle corresponding to a parallel state of the lane line in the lane line image are recorded, to ensure accuracy of the pitch angle and the yaw angle, and reduce an adverse effect of the pitch angle and the yaw angle on determination of the roll angle.

In some embodiments, the computer device is configured to perform, based on the pitch angle, the yaw angle, and the target roll angle, IPM projection on the lane line detection point in the $i^{th}$ image frame, to obtain the lane line detection result of the $i^{th}$ image frame in the vehicle body coordinate system.

In some embodiments, the pitch angle is a, the yaw angle is b, the set target roll angle is c, and K is 5 in response to that the fitted lane lines are parallel. The computer device performs, based on the pitch angle, the yaw angle, and the target roll angle, IPM projection on the lane line detection point in the $i^{th}$ image frame, to obtain the lane line detection result of the $i^{th}$ image frame in the vehicle body coordinate system, where i is a positive integer less than or equal to 5.

Step 1750: Perform position correction on the lane line detection result of the $i^{th}$ image frame in the vehicle body coordinate system based on position and attitude information of the vehicle at a timestamp corresponding to the $i^{th}$ image frame, to obtain a corrected lane line detection result corresponding to the $i^{th}$ image frame.

In some embodiments, the computer device is further configured to: obtain reference position and attitude information of the vehicle at a reference timestamp, the reference position and attitude information including a reference position and a reference attitude of the vehicle at the reference timestamp; determine a position of the vehicle at a timestamp corresponding to the $i^{th}$ image frame based on the reference position of the vehicle at the reference timestamp, an interval between the timestamp corresponding to the $i^{th}$ image frame and the reference timestamp, and a speed of the vehicle; and determine a attitude of the vehicle at the timestamp corresponding to the $i^{th}$ image frame based on a reference attitude of the vehicle at the reference timestamp, the interval between the timestamp corresponding to the $i^{th}$ image frame and the reference timestamp, and an angular speed of the vehicle the position and attitude information of the vehicle at the timestamp corresponding to the $i^{th}$ image frame including: a position and an attitude of the vehicle at the timestamp corresponding to the $i^{th}$ image frame.

In some embodiments, a reference timestamp is an $(i-1)^{th}$ timestamp. The computer device is configured to: obtain a position and an attitude of a vehicle at the $(i-1)^{th}$ timestamp, and determine a position of the vehicle at a timestamp corresponding to the $i^{th}$ image frame based on the position of the vehicle at the $(i-1)^{th}$ timestamp, an interval between the timestamp corresponding to the $i^{th}$ image frame and the $(i-1)^{th}$ timestamp, and a speed of the vehicle; and determine a attitude of the vehicle at the timestamp corresponding to the $i^{th}$ image frame based on an attitude of the vehicle at the $(i-1)^{th}$ timestamp, the interval between the timestamp corresponding to the $i^{th}$ image frame and the $(i-1)^{th}$ timestamp, and an angular speed of the vehicle, the position and attitude information of the vehicle at the timestamp corresponding to the $i^{th}$ image frame including: a position and an attitude of the vehicle at the timestamp corresponding to the $i^{th}$ image frame. The position and attitude information of the first timestamp is 0. i is an integer greater than 1 and less than or equal to K.

In some embodiments, the position and attitude information of the vehicle may be obtained by using a speed through gyroscope pre-integration:

$$p \leftarrow 10p + v\Delta t + \frac{1}{2}(R(a_m - a_b) + g)\Delta t^2$$
$$v \leftarrow v + (R(a_m - a_b) + g)\Delta t$$
$$q \leftarrow q \otimes q\{(\omega_m - \omega_b)\Delta t\}$$

where p represents a position, v represents a speed (from a wheel speed), $a_m$ represents a measured acceleration, a b represents a zero bias of an accelerometer, R represents a conversion from an accelerometer coordinate system to a vehicle body coordinate system, g represents an acceleration of gravity, usually $$9.8 \frac{m}{s^2},$$

q represents an attitude, that is, a quaternion array of an rotation angle, $\omega_m$ represents a measured angular speed, $\omega_b$ represents a zero bias of a gyroscope, $\Delta t$ represents a time interval of adjacent image frames. Since the integration time is short, that is, the time in a sliding window, acceleration can be ignored; and the bias (zero bias) of the gyroscope is small and can be ignored in a short time, so the formula for pre-integration may be rewritten as:

$$p \leftarrow 11p + v\Delta t$$

$$q \leftarrow q \otimes q\{\omega_m \Delta t\}$$

For the parameter explanation of the above two formulas, reference may be made to the above embodiments, which are not repeated here.

In some embodiments, the computer device determines at least one image group from an image frame sequence by using a sliding window. A first image group of the at least one image group is any one of the at least one image group. In some embodiments, the first image group includes x image frames, where x is a positive integer greater than 1. For example, the first image group includes three image frames, which are successively the first image frame, the second image frame, and the third image frame in chronological order of a photographing time.

In some embodiments, the computer device determines a lane line detection result corresponding to each image frame in the first image group, respectively. In some embodiments, the computer device performs IPM mapping on an $x^{th}$ image frame through the target roll angle, the pitch angle, and the yaw angle, and determines the lane line detection result of the $x^{th}$ image frame; and the computer device calculates the position and attitude information corresponding to the $x^{th}$ image frame, the position and attitude information of the $x^{th}$ image frame of the computer device corrects a lane line detection result corresponding to a first $(x-1)^{th}$ image frame respectively (Δattitude correction), and obtains the corrected lane line detection result corresponding to the first $(x-1)^{th}$ image frame respectively.

Since the shooting time of different image frames is different, that is, different image frames correspond to different vehicle body coordinate systems, the position and attitude information is used for correcting the lane line detection result corresponding to the first $(x-1)^{th}$ image frame, which is equivalent to transferring the lane line detection points in the first $(x-1)^{th}$ image frame to the vehicle body coordinate system corresponding to the $x^{th}$ image frame. The vehicle body coordinate system to which the lane detection points in the plurality of image frames belong is unified, which helps to improve accuracy of the determined roll angle.

Step 1760: Integrate the corrected lane line detection results respectively corresponding to the K image frames in the vehicle body coordinate system, to obtain the lane line detection result corresponding to the target image group at the target roll angle.

Step 1770: Fit the lane line detection result corresponding to the target image group at the target roll angle, to obtain the lane line image corresponding to the target image group at the target roll angle.

Step 1780: Obtain a lane line image set corresponding to the target roll angle based on lane line images corresponding to the plurality of image groups at a target roll angle.

Step 1790: Determine the roll angle of the on-board camera based on lane line image sets respectively corresponding to different roll angles.

In embodiments consistent with the present disclosure, for an $i^{th}$ image frame of the K image frames included in the target image group, the lane line detection point in the $i^{th}$ image frame from a camera coordinate system corresponding to the on-board camera to a vehicle body coordinate system corresponding to the vehicle based on a pitch angle, a yaw angle, and the target roll angle of the on-board camera is converted to obtain a lane line detection result of the $i^{th}$ image frame in the vehicle body coordinate system. As a result, the speed of obtaining the lane line detection result of the $i^{th}$ image frame in the vehicle body coordinate system can be accelerated, and accuracy of the obtained lane line detection result can be improved, which is convenient for subsequent fitting operations. At the same time, position correction is performed on the lane line detection result of the $i^{th}$ image frame in the vehicle body coordinate system based on position and attitude information of the vehicle at a timestamp corresponding to the $i^{th}$ image frame, to obtain a corrected lane line detection result corresponding to the $i^{th}$ image frame. As a result, the lane line detection result is made more accurate, and accuracy of roll angle calibration can be further improved based on the more accurate lane line detection result.

Figure 19:
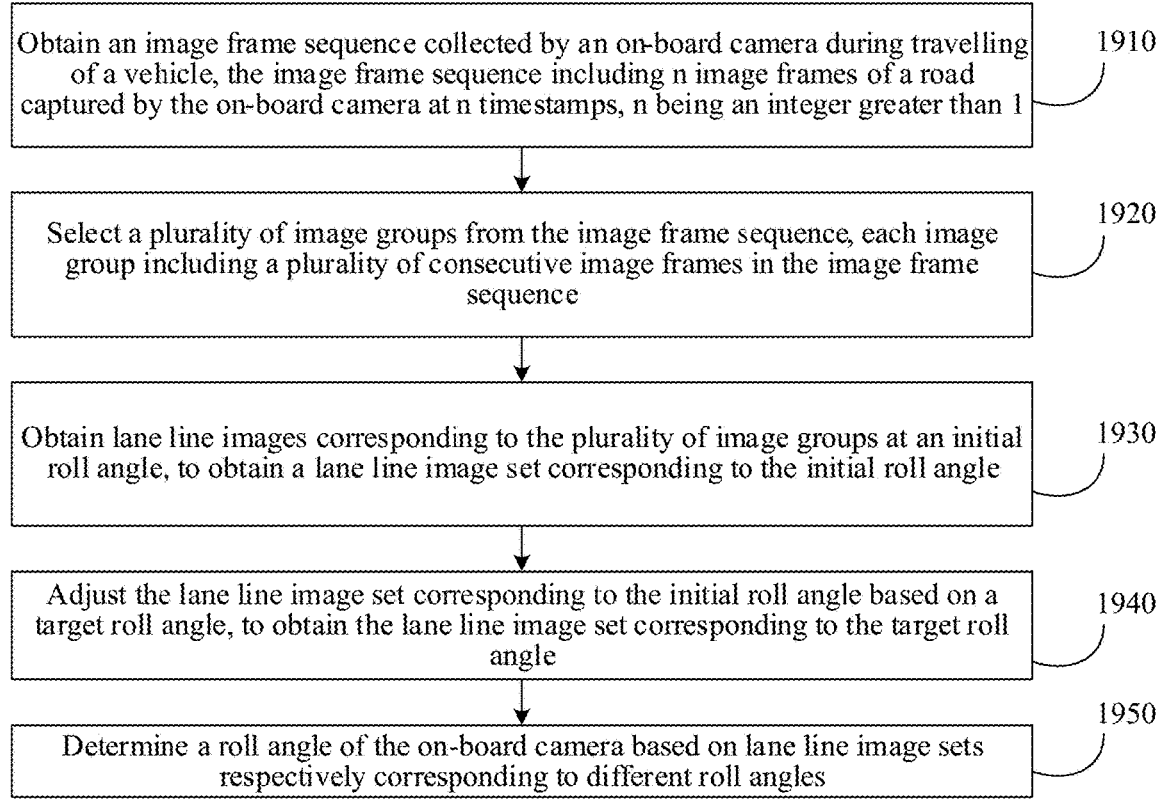
FIG. 19 is a flowchart of a method for calibrating a roll angle of an on-board camera according to another embodiment of this application.

FIG. 19 is a flowchart of a method for calibrating a roll angle of an on-board camera according to another embodiment of this application. The execution body of each step of the method may be the computer device 42 in the implementation environment shown in FIG. 4. In the following method embodiments, for ease of description, the steps are performed by a computer device, for example. The method may include at least one of the following steps (1910 to 1950).

Step 1910: Obtain an image frame sequence collected by the on-board camera while a vehicle is in motion, the image frame sequence including n image frames of a road captured by the on-board camera at n timestamps, n being an integer greater than 1.

The computer device is configured to: obtain, for a target image group in the plurality of image groups, lane line detection results respectively corresponding to K image frames included in the target image group, each of the lane line detection results including a lane line detection point obtained through detection of the lane line in each of the image frames, and K being an integer greater than 1; integrate the lane line detection results respectively corresponding to the K image frames included in the target image group, to obtain a lane line detection result corresponding to the target image group at the initial roll angle; fit the lane line detection result corresponding to the target image group at the initial roll angle, to obtain the lane line image corresponding to the target image group at the initial roll angle; and obtain the lane line image set corresponding to the initial roll angle based on the lane line images corresponding to the plurality of image groups at the initial roll angle. In some embodiments, an initial roll angle is 0.0.

Step 1920: Select a plurality of image groups from the image frame sequence, each of the image groups including a plurality of consecutive image frames in the image frame sequence.

Step 1930: Obtain lane line images corresponding to the plurality of image groups at an initial roll angle, to obtain a lane line image set corresponding to the initial roll angle.

In some embodiments, the initial roll angle is 0.0, lane line images corresponding to a plurality of image groups when the initial roll angle is 0.0 are obtained, and a lane line image set corresponding to the initial roll angle is 0.0 is obtained.

Step 1940: Adjust the lane line image set corresponding to the initial roll angle based on a target roll angle, to obtain the lane line image set corresponding to the target roll angle.

In some embodiments, the computer device adjusts a position of each lane line in the lane line image set corresponding to the initial roll angle based on the target roll angle, to obtain the lane line image set corresponding to the target roll angle. In some embodiments, the computer device adjusts an inclination degree of each lane line in the lane line image set corresponding to the initial roll angle based on the target roll angle, to obtain the lane line image set corresponding to the target roll angle. In some embodiments, the roll angle may be understood as an inclination degree of a lane line. After determining the target roll angle, by adjusting the lane line image set corresponding to the initial roll angle and the inclination degree of each lane line, the lane line image set corresponding to the target roll angle is obtained, so that the inclination degree of each lane line included in the lane line image set corresponding to the target roll angle is adapted to the target roll angle.

In some embodiments, the lane line image set corresponding to the initial roll angle conforms to a quantity of lane line images in which a difference between a maximum spacing and a minimum spacing of adjacent lane lines in the lane line image is less than or equal to 30 cm. Subsequently, the computer device adjusts the initial roll angle to obtain the target roll angle. In some embodiments, the computer device determines the lane line image set corresponding to the target roll angle, and counts the quantity of lane line images that satisfy the first condition in the lane line image set corresponding to the target roll angle. In some embodiments, the first condition is that a difference between a maximum spacing and a minimum spacing between adjacent lane lines in the lane line image is less than or equal to 30 cm.

In response to that the quantity of lane line images in which the difference between the maximum spacing and the minimum spacing of adjacent lane lines in the lane line image set corresponding to the target roll angle is less than or equal to 30 cm is greater than the quantity of lane line images corresponding to the initial roll angle, the computer device continues to increase the target roll angle. In response to that the lane line image set corresponding to the target roll angle matches the maximum quantity of lane line images in which the difference between the maximum spacing and the minimum spacing of adjacent lane lines in the lane line image is less than or equal to 30 cm, the computer device determines that the roll angle of the lane line image set is the roll angle of the on-board camera.

Step 1950: Determine a roll angle of the on-board camera based on lane line image sets respectively corresponding to different roll angles.

In embodiments consistent with the present disclosure, the lane line image set corresponding to the initial roll angle based on the target roll angle is adjusted to obtain the lane line image set corresponding to the target roll angle. The roll angle can be calibrated by adjusting the target roll angle, which reduces the amount of data processing to a certain extent and saves time of data processing.

Figure 20:
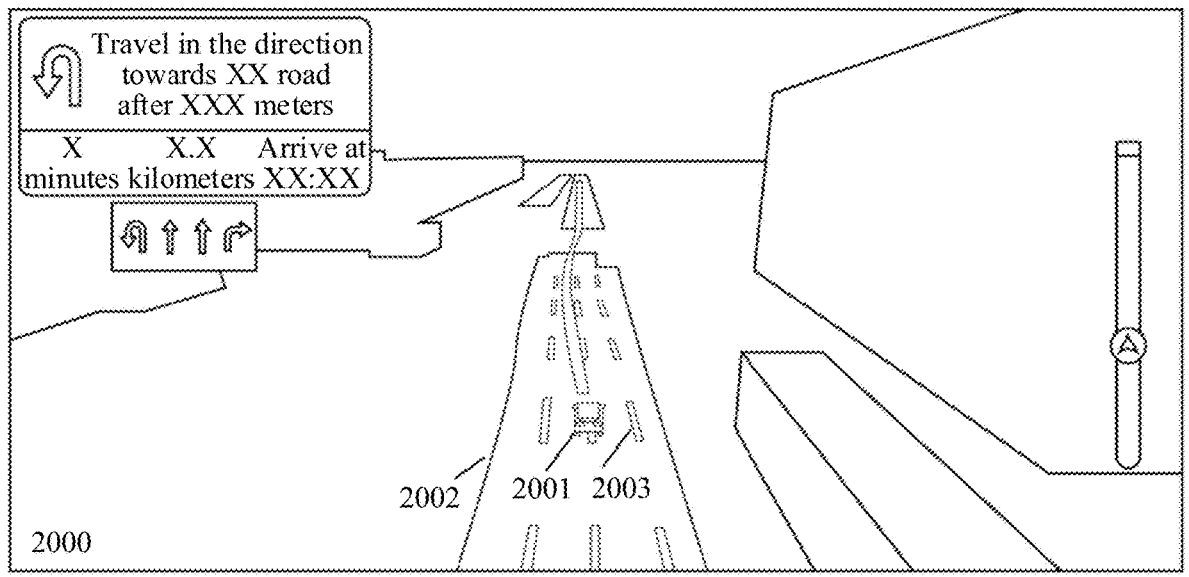
FIG. 20 shows an application scenario according to an embodiment of this application.

FIG. 20 exemplarily shows an application scenario according to an embodiment of this application. FIG. 20 is a high-precision navigation map 2000. Vehicle 2001, a road 2002, a lane line 2003, and the like are displayed on the map 2000. The lane line 2003 is obtained by taking pictures of the current road 2002 and processing based on the roll angle determined by the method of this application. Generally, the navigation map is to provide directional guidance to a driver. Identifying a sign, an entrance complication, a pedestrian, and the like is done by the driver. Through the method of this application, the roll angle calibration of the on-board camera can be achieved, and the lane line can be accurately described, so that the description of the entire road is more accurate, clear, and comprehensive, and the high-precision navigation map as shown in FIG. 20 can be obtained.

The following describes apparatus embodiments of this application, which can be used for performing the method embodiment of calibrating the roll angle of the on-board camera of this application. For details not disclosed in the apparatus embodiments of this application, refer to the above embodiments of this application.

Figure 21:
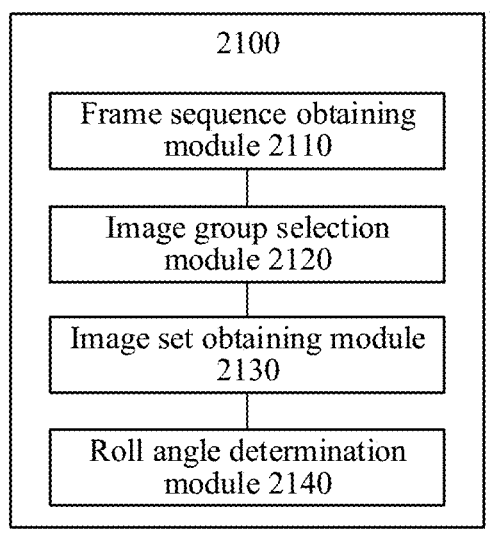
FIG. 21 is a block diagram of an apparatus for calibrating a roll angle of an on-board camera according to an embodiment of this application.

FIG. 21 is a block diagram of an apparatus for calibrating a roll angle of an on-board camera according to an embodiment of this application. The apparatus has a function of performing the foregoing method embodiments, the function may be implemented by hardware or may be implemented by hardware executing corresponding software. The apparatus may be the computer device described above, or may be arranged on the computer device. As shown in FIG. 21, apparatus 2100 may include a frame sequence obtaining module 2110, an image group selection module 2120, an image set obtaining module 2130, and a roll angle determination module 2140.

The frame sequence obtaining module 2110 is configured to obtain an image frame sequence collected by the on-board camera while a vehicle is in motion, the image frame sequence including n image frames of a road captured by the on-board camera at n timestamps, n being an integer greater than 1.

The image group selection module 2120 is configured to select a plurality of image groups from the image frame sequence, each of the image groups including a plurality of consecutive image frames in the image frame sequence.

The image set obtaining module 2130 is configured to obtain lane line images corresponding to the plurality of image groups at a target roll angle, to obtain a lane line image set corresponding to the target roll angle, the lane line image corresponding to each of the image groups at the target roll angle including at least one lane line obtained through fitting of lane line detection points extracted from a plurality of image frames included in the image group at the target roll angle.

The roll angle determination module 2140 is configured to determine the roll angle of the on-board camera based on lane line image sets corresponding to different roll angles.

Figure 22:
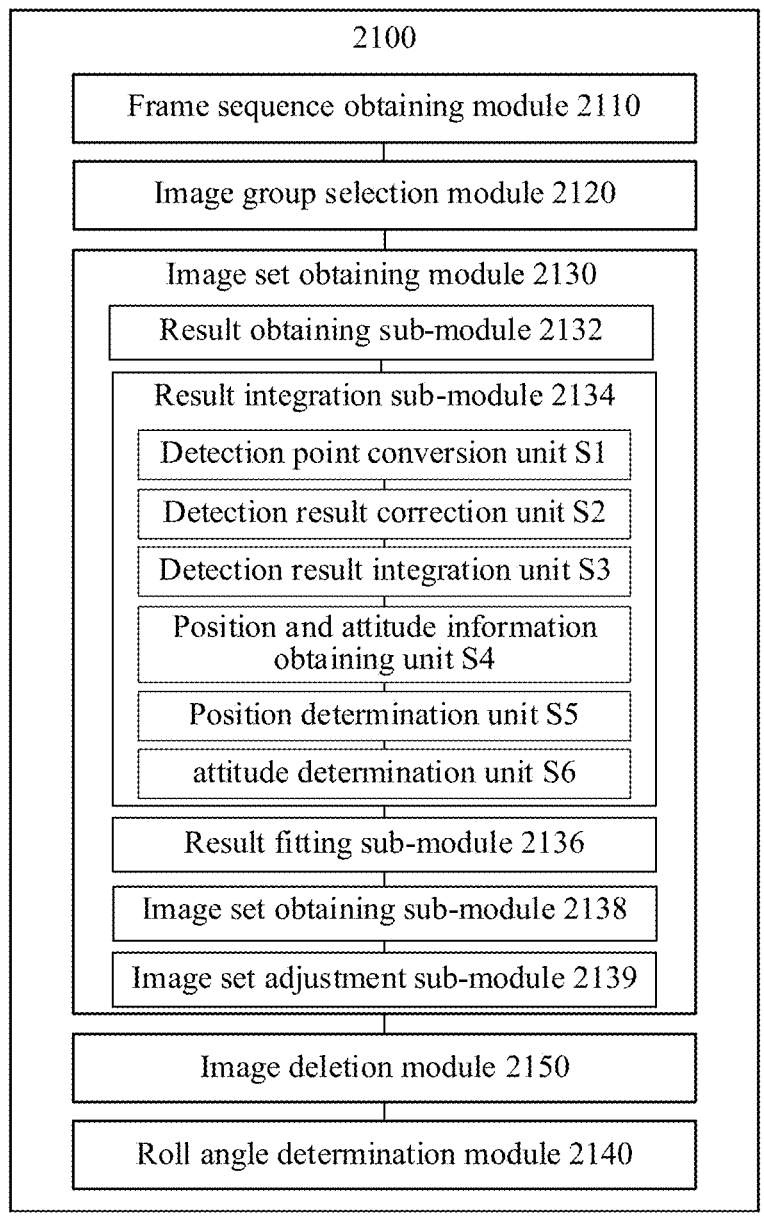
FIG. 22 is a block diagram of an apparatus for calibrating a roll angle of an on-board camera according to another embodiment of this application.

In some embodiments, as shown in FIG. 22, the image set obtaining module 2130 includes a result obtaining sub-module 2132, a result integration sub-module 2134, a result fitting sub-module 2136, and an image set obtaining sub-module 2138.

The result obtaining sub-module 2132 is configured to obtain, for a target image group in the plurality of image groups, lane line detection results respectively corresponding to K image frames included in the target image group, each of the lane line detection results including a lane line detection point obtained through detection of the lane line in each of the image frames, and K being an integer greater than 1.

The result integration sub-module 2134 is configured to integrate the lane line detection results respectively corresponding to the K image frames included in the target image group, to obtain a lane line detection result corresponding to the target image group at the target roll angle.

The result fitting sub-module 2136 is configured to fit the lane line detection result corresponding to the target image group at the target roll angle, to obtain the lane line image corresponding to the target image group at the target roll angle.

The image set obtaining sub-module 2138 is configured to obtain lane line images corresponding to the plurality of image groups at a target roll angle, to obtain a lane line image set corresponding to the target roll angle.

In some embodiments, as shown in FIG. 22, the result integration sub-module 2134 includes a detection point conversion unit S1, a detection result correction unit S2, and a detection result integration unit S3.

The detection point conversion unit S1 is configured to convert, for an $i^{th}$ image frame of the K image frames included in the target image group, the lane line detection point in the $i^{th}$ image frame from a camera coordinate system corresponding to the on-board camera to a vehicle body coordinate system corresponding to the vehicle based on a pitch angle, a yaw angle, and the target roll angle of the on-board camera, to obtain a lane line detection result of the $i^{th}$ image frame in the vehicle body coordinate system, i being a positive integer less than or equal to K.

The detection result correction unit S2 is configured to perform position correction on the lane line detection result of the $i^{th}$ image frame in the vehicle body coordinate system based on position and attitude information of the vehicle at a timestamp corresponding to the $i^{th}$ image frame, to obtain a corrected lane line detection result corresponding to the $i^{th}$ image frame.

The detection result integration unit S3 is configured to integrate the corrected lane line detection results respectively corresponding to the K image frames in the vehicle body coordinate system, to obtain the lane line detection result corresponding to the target image group at the target roll angle.

In some embodiments, as shown in FIG. 22, the detection point conversion unit S1 is configured to: obtain a pitch angle and a yaw angle of the on-board camera, the pitch angle and the yaw angle being obtained through IPM projection based on a parallel relationship of the lane lines; and perform, based on the pitch angle, the yaw angle, and the target roll angle, IPM projection on the lane line detection point in the $i^{th}$ image frame, to obtain the lane line detection result of the $i^{th}$ image frame in the vehicle body coordinate system.

In some embodiments, as shown in FIG. 22, the result integration sub-module 2134 further includes a position and attitude information obtaining unit S4, a position determination unit S5, and an attitude determination unit S6.

The position and attitude information obtaining unit S4 is configured to obtain reference position and attitude information of the vehicle at a reference timestamp, the reference position and attitude information including a reference position and a reference attitude of the vehicle at the reference timestamp.

The position determination unit S5 is configured to determine a position of the vehicle at a timestamp corresponding to the $i^{th}$ image frame based on the reference position of the vehicle at the reference timestamp, an interval between the timestamp corresponding to the $i^{th}$ image frame and the reference timestamp, and a speed of the vehicle.

The attitude determination unit S6 is configured to determine a attitude of the vehicle at the timestamp corresponding to the $i^{th}$ image frame based on a reference attitude of the vehicle at the reference timestamp, the interval between the timestamp corresponding to the $i^{th}$ image frame and the reference timestamp, and an angular speed of the vehicle.

In some embodiments, the result fitting sub-module 2136 is configured to: fit the lane line detection result corresponding to the target image group at the target roll angle by using a first-order function, to obtain a first fitting result, and determine a fitting error corresponding to the first fitting result; fit the lane line detection result corresponding to the target image group at the target roll angle by using a second-order function, to obtain a second fitting result, and determine a fitting error corresponding to the second fitting result; determine the first fitting result as the lane line image corresponding to the target image group at the target roll angle in response to that the fitting error corresponding to the first fitting result is less than the fitting error corresponding to the second fitting result; and determine the second fitting result as the lane line image corresponding to the target image group at the target roll angle in response to that the fitting error function corresponding to the first fitting result is greater than the fitting error corresponding to the second fitting result.

In some embodiments, the result obtaining sub-module 2132 is configured to process an $i^{th}$ image frame of the K image frames included in the target image group by using a lane line detection model, to obtain the lane line detection result corresponding to the $i^{th}$ image frame, the lane line detection model being an AI model configured to extract the lane line detection point.

In some embodiments, as shown in FIG. 22, the image set obtaining module 2130 further includes an image set adjustment sub-module 2139.

The image set obtaining sub-module 2138 is configured to obtain lane line images corresponding to the plurality of image groups at an initial roll angle, to obtain a lane line image set corresponding to the initial roll angle.

The image set adjustment sub-module 2139 is configured to adjust the lane line image set corresponding to the initial roll angle based on the target roll angle, to obtain the lane line image set corresponding to the target roll angle.

In some embodiments, the image set adjustment sub-module 2139 is configured to adjust a position of each lane line in the lane line image set corresponding to the initial roll angle based on the target roll angle, to obtain the lane line image set corresponding to the target roll angle.

In some embodiments, the result obtaining sub-module 2132 is configured to obtain, for a target image group in the plurality of image groups, lane line detection results respectively corresponding to K image frames included in the target image group, each of the lane line detection results including a lane line detection point obtained through detection of the lane line in each of the image frames, and K being an integer greater than 1.

The result integration sub-module 2134 is configured to integrate the lane line detection results respectively corresponding to the K image frames included in the target image group, to obtain a lane line detection result corresponding to the target image group at the initial roll angle.

The result fitting sub-module 2136 is configured to fit the lane line detection result corresponding to the target image group at the initial roll angle, to obtain the lane line image corresponding to the target image group at the initial roll angle.

The image set obtaining sub-module 2138 is configured to obtain the lane line image set corresponding to the initial roll angle based on the lane line images corresponding to the plurality of image groups at the initial roll angle.

In some embodiments, the roll angle determination module 2140 is configured for a quantity counting sub-module 2142, configured to count a quantity of lane line images in the lane line image set corresponding to each of the roll angles that meet a first condition, the first condition being set based on a distance between adjacent lane lines in the lane line image; and determine the roll angle corresponding to the lane line image set in which the quantity of lane line images meets a second condition as the roll angle of the on-board camera.

In some embodiments, the first condition includes: a difference between a maximum spacing and a minimum spacing between adjacent lane lines in the lane line image is less than or equal to a threshold.

In some embodiments, the second condition includes: the quantity of lane line images is a maximum value.

In some embodiments, the image group selection module 2120 is configured to move a sliding window to a plurality of different positions in the image frame sequence to obtain the plurality of image groups, a plurality of consecutive image frames included in the sliding window at each position corresponding to one image group.

In some embodiments of this application, as shown in FIG. 22, the apparatus 2100 further includes an image deletion module 2150.

The image deletion module 2150 is configured to delete the lane line image in the lane line image set that meets a third condition, to obtain a screened lane line image set, the third condition including at least one of: a lane line fitting error is greater than or equal to a first threshold, and a quantity of the at least one lane line that is included is less than or equal to a second threshold.

The roll angle determination module 2140 is further configured to determine the roll angle of the on-board camera based on lane line image sets respectively corresponding to different roll angles.

In some embodiments, the apparatus 2100 further includes a post-processing module (not shown in FIG. 22), and is configured to: apply the roll angle of the on-board camera to a navigation map, to determine a lane in which the vehicle is located; and perform navigation prompt or automatic driving control based on the lane in which the vehicle is located.

In the technical solution provided by embodiments of this application, when determining the roll angle of the on-board camera, the plurality of image frames collected by the on-board camera is used as a reference, which avoids an error of only considering a single frame of image, and helps to improve accuracy of a final determined roll angle. In addition, this application adopts an idea of big data statistics. Through fitting of a plurality of lane line image sets corresponding to different roll angles, the roll angle corresponding to the lane line image set with the overall optimal fitting result is selected as the final roll angle corresponding to the on-board camera, which reduces the fitted lane line error and improves accuracy of the roll angle calibration.

It should be noted that when the apparatus provided in the foregoing embodiment implements the functions of the apparatus, only division of the foregoing function modules is used as an example for description. In the practical application, the functions may be allocated to and completed by different function modules according to requirements. That is, the internal structure of the device is divided into different function modules, to complete all or some of the functions described above. In addition, the apparatus in the above embodiment belongs to the same idea as the method. For a specific implementation thereof, refer to the method embodiment, and the details are not described herein.

Figure 23:
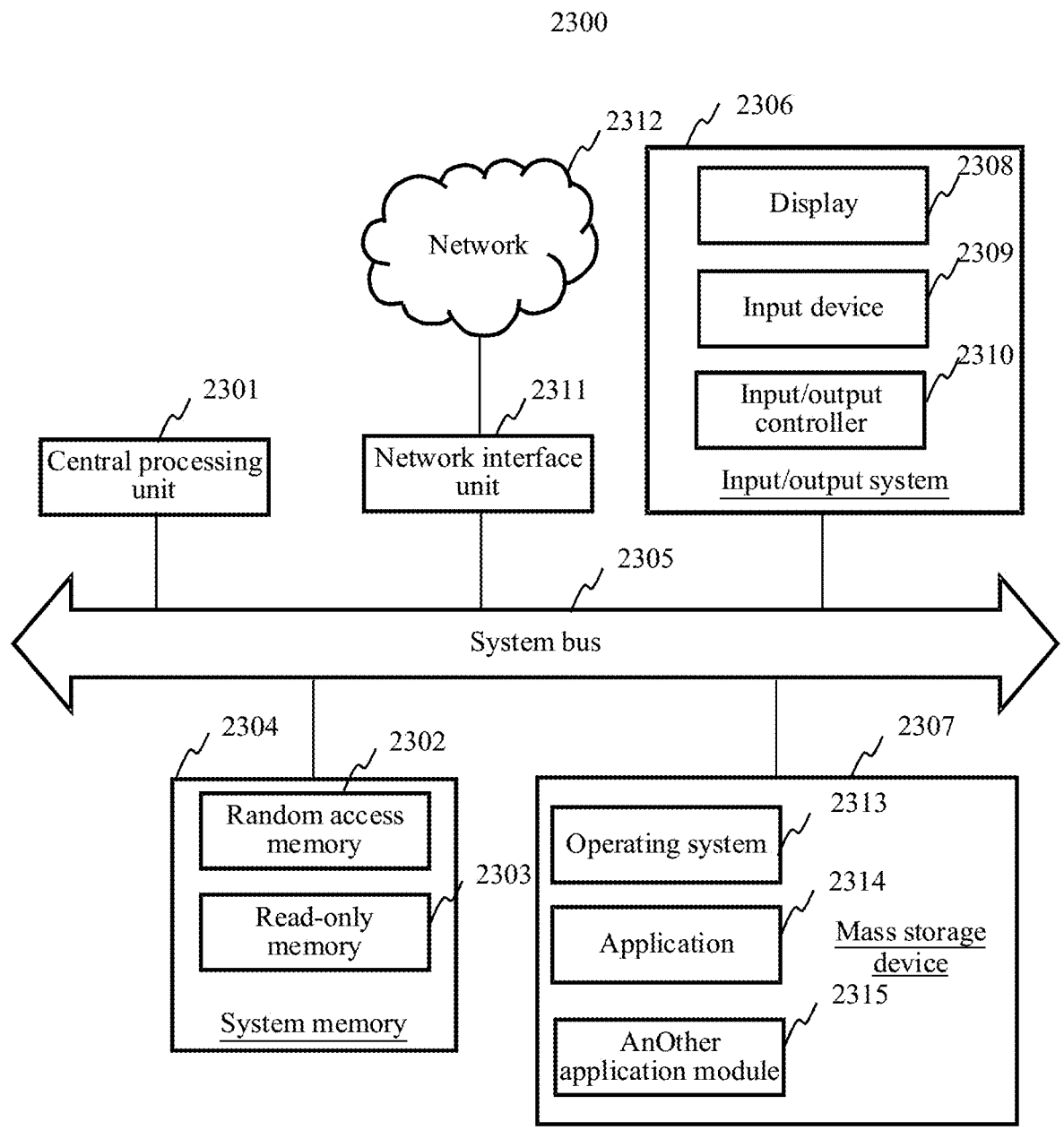
FIG. 23 is a structural block diagram of a computer device according to an embodiment of this application.

FIG. 23 is a structural block diagram of a computer device 2300 according to an embodiment of this application. Specifically, the computer device 2300 includes a central processing unit (CPU) 2301, a system memory 2304 including a random access memory (RAM) 2302 and a read only memory (ROM) 2303, and a system bus 2305 connecting the system memory 2304 and the CPU 2301. The computer device 2300 further includes a basic input/output (I/O) system 2306 assisting in transmitting information between components in the computer, and a mass storage device 2307 configured to store an operating system 2313, an application program 2314, and another program module 2315.

The basic I/O system 2306 includes a display 2308 configured to display information and an input device 2309 such as a mouse or a keyboard that is used for inputting information by a user. The display 1008 and the input device 2309 are both connected to the central processing unit 2301 by using an input/output controller 2310 that is connected to the system bus 2305. The basic I/O system 2306 may further include the input and output controller 2310 to be configured to receive and process inputs from a plurality of other devices such as a keyboard, a mouse, and an electronic stylus. Similarly, the input/output controller 2310 further provides an output to a display screen, a printer, or another type of output device.

The mass storage device 2307 is connected to the CPU 2301 by using a mass storage controller (not shown) connected to the system bus 2305. The mass storage device 2307 and a computer-readable medium associated with the large-capacity storage device provide non-volatile storage to the computer device 2300. That is, the mass storage device 1007 may include the computer readable medium (not shown) such as a hard disk or a compact disc read-only memory (CD-ROM) drive.

Generally, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM, (EPROM), an electrically erasable programmable read-only memory an erasable programmable ROM (EEPROM), a flash memory or other solid-state storage technologies, a CD-ROM, a digital versatile disc (DVD) or another optical memory, a tape cartridge, a magnetic cassette, a magnetic disk memory, or other magnetic storage device. Certainly, a person skilled in art can know that the computer storage medium is not limited to the foregoing several types. The system memory 2304 and the mass storage device 2307 may be collectively referred to as a memory.

According to the embodiments of this application, the computer device 2300 may further be connected, through a network such as the Internet, to a remote computer on the network and run. That is, the computer device 2300 may be connected to a network 2312 by using a network interface unit 2311 connected to the system bus 2305, or may be connected to another type of network or a remote computer system (not shown) by using a network interface unit 2311.

In one embodiment, a computer-readable storage medium is further provided. The storage medium stores a computer program, and the computer program, when executed by a processor, implements the method for calibrating a roll angle of an on-board camera.

In some embodiments, the computer-readable storage medium includes a read-only memory (ROM), a random access memory (RAM), a solid state drive (SSD), an optical disc, and the like. The RAM may include a resistance random access memory (ReRAM) and a dynamic random access memory (DRAM).

In one embodiment, a computer program product is further provided. The computer program product includes computer instructions, and the computer instructions are stored in the computer-readable storage medium. The processor of the computer device reads the computer instructions from the computer-readable storage medium. The processor executes the computer instructions, so that the computer device executes the above method for calibrating a roll angle of an on-board camera.

In some embodiments, the "computer instructions" in the above content is referred to as the "computer program", and both have the same meaning.

It is to be understood that the term "K" in the description means two or more. The term "and/or" is an association relationship for describing associated objects and represents that three relationships may exist. For example, A and/or B may represent the following three cases: only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited to the embodiments of this application.

It should be noted that the information, data, and signals in this application are all authorized by the user or fully authorized by all parties, and collection, use, and processing of relevant data need to comply with relevant laws, regulations, and standards of relevant countries and regions. For example, the image frames referred to in this application are obtained and used with full authorization.

The foregoing descriptions are merely embodiments of this application, but are not intended to limit this application. Any modification, equivalent replacement, or improvement made within the spirit and principle of this application shall fall within the protection scope of this application.

What is claimed is:

1. A method for calibrating a roll angle of an on-board camera, the method being performed by a computer device, and the method comprising:

obtaining an image frame sequence collected by the on-board camera while a vehicle is in motion, the image frame sequence comprising n image frames of a road captured by the on-board camera at n timestamps, n being an integer greater than 1;

selecting a plurality of image groups from the image frame sequence, each of the image groups comprising a plurality of consecutive image frames in the image frame sequence;

for each of a plurality of candidate roll angles:
for each image group, determining a lane line image at the respective candidate roll angle, wherein lane line detection points are extracted from the consecutive image frames in the respective image group, and the lane line image comprises at least one lane line determined by fitting the lane line detection points; and obtaining a lane line image set comprising lane line images respectively corresponding to the image groups;

and determining the roll angle of the on-board camera based on a first quantity of lane line images in at least one of lane line image sets respectively corresponding to the plurality of candidate roll angles and at least one condition.

2. The method according to claim 1, wherein for each image group, determining the lane-line image at the respective candidate roll angle comprises:

obtaining first lane line detection results corresponding to K image frames in the respective image group, each of the first lane line detection results comprising lane line detection points obtained through detection of a lane line in each of the K image frames, and K being an integer greater than 1;

integrating the first lane line detection results corresponding to the K image frames in the respective image group, to obtain a second lane line detection result corresponding to the respective image group at the respective candidate roll angle; and fitting the second lane line detection result corresponding to the respective image group at the respective candidate roll angle, to obtain the lane line image corresponding to the respective image group at the respective candidate roll angle.

3. The method according to claim 2, wherein the integrating the first lane line detection results corresponding to the K image frames in the respective image group, to obtain the second lane line detection result corresponding to the respective image group at the respective candidate roll angle comprises:

converting, for an $i^{th}$ image frame of the K image frames in the respective image group, the lane line detection points in the $i^{th}$ image frame from a camera coordinate system corresponding to the on-board camera to a vehicle body coordinate system corresponding to the vehicle based on a pitch angle, a yaw angle, and the respective candidate roll angle of the on-board camera, to obtain a third lane line detection result of the $i^{th}$ image frame in the vehicle body coordinate system, i being a positive integer less than or equal to K;

performing position correction on the third lane line detection result of the $i^{th}$ image frame in the vehicle body coordinate system based on position and attitude information of the vehicle at a timestamp corresponding to the $i^{th}$ image frame, to obtain a corrected lane line detection result corresponding to the $i^{th}$ image frame; and integrating the corrected lane line detection results corresponding to the K image frames in the vehicle body coordinate system, to obtain the second lane line detection result corresponding to the respective image group at the respective candidate roll angle.

4. The method according to claim 3, wherein the converting the lane line detection points in the $i^{th}$ image frame from the camera coordinate system corresponding to the on-board camera to the vehicle body coordinate system corresponding to the vehicle based on the pitch angle, the yaw angle, and the respective candidate roll angle of the on-board camera, to obtain the third lane line detection result of the $i^{th}$ image frame in the vehicle body coordinate system comprises:

obtaining the pitch angle and the yaw angle of the on-board camera through inverse perspective mapping (IPM) projection based on a parallel relationship of lane lines; and performing, based on the pitch angle, the yaw angle, and the respective candidate roll angle, the IPM projection on the lane line detection points in the $i^{th}$ image frame, to obtain the third lane line detection result of the $i^{th}$ image frame in the vehicle body coordinate system.

5. The method according to claim 3, further comprising: obtaining reference position and attitude information of the vehicle at a reference timestamp, the reference position and attitude information comprising a reference position and a reference attitude of the vehicle at the reference timestamp;

determining a position of the vehicle at a timestamp corresponding to the $i^{th}$ image frame based on the reference position of the vehicle at the reference timestamp, an interval between the timestamp corresponding to the $i^{th}$ image frame and the reference timestamp, and a speed of the vehicle; and determining an attitude of the vehicle at the timestamp corresponding to the $i^{th}$ image frame based on the reference attitude of the vehicle at the reference timestamp, the interval between the timestamp corresponding to the $i^{th}$ image frame and the reference timestamp, and an angular speed of the vehicle.

6. The method according to claim 2, wherein the fitting the second lane line detection result corresponding to the respective image group at the respective candidate roll angle, to obtain the lane line image corresponding to the respective image group at the respective candidate roll angle comprises:

fitting the second lane line detection result corresponding to the respective image group at the respective candidate roll angle by using a first-order function, to obtain a first fitting result, and determining a first fitting error corresponding to the first fitting result;

fitting the second lane line detection result corresponding to the respective image group at the respective candidate roll angle by using a second-order function, to obtain a second fitting result, and determining a second fitting error corresponding to the second fitting result;

determining the first fitting result as the lane line image corresponding to the respective image group at the respective candidate roll angle in response to that the first fitting error corresponding to the first fitting result being less than the second fitting error corresponding to the second fitting result; and determining the second fitting result as the lane line image corresponding to the respective image group at the respective candidate roll angle in response to the first fitting error corresponding to the first fitting result being greater than the second fitting error corresponding to the second fitting result.

7. The method according to claim 2, wherein the obtaining the first lane line detection results corresponding to the K image frames in the respective image group comprises:

processing an $i^{th}$ image frame of the K image frames in the respective image group by using a lane line detection model, to obtain the first lane line detection result corresponding to the $i^{th}$ image frame, the lane line detection model being an artificial intelligence (AI) model configured to extract the lane line detection points.

8. The method according to claim 1, wherein for each image group, the determining the lane line image at the respective candidate roll angle, and the obtaining the lane line image set comprising the lane line images respectively corresponding to the image groups comprises:

for each image group, determining an initial lane line image at an initial roll angle;

obtaining an initial lane line image set corresponding to the initial roll angle, the initial lane line image set comprising the initial lane line images respectively corresponding to the image groups; and adjusting the initial lane line image set corresponding to the initial roll angle based on the respective candidate roll angle, to obtain the lane line image set corresponding to the respective candidate roll angle.

9. The method according to claim 8, wherein the adjusting the initial lane line image set corresponding to the initial roll angle based on the respective candidate roll angle, to obtain the lane line image set corresponding to the respective candidate roll angle comprises:

adjusting a position of each lane line in the initial lane line image set corresponding to the initial roll angle based on the respective candidate roll angle, to obtain the lane line image set corresponding to the respective candidate roll angle.

10. The method according to claim 8, wherein for each image group, the determining the initial lane line image at the initial roll angle comprises:

obtaining first initial lane line detection results corresponding to K image frames in the respective image group, each of the first initial lane line detection results comprising lane line detection points obtained through detection of a lane line in each of the K image frames, and K being an integer greater than 1;

integrating the first initial lane line detection results corresponding to the K image frames in the respective image group, to obtain a second initial lane line detection result corresponding to the respective image group at the initial roll angle;

fitting the second initial lane line detection result corresponding to the respective image group at the initial roll angle, to obtain the initial lane line image corresponding to the respective image group at the initial roll angle.

11. The method according to claim 1, wherein the determining the roll angle of the on-board camera based on the lane line image sets corresponding to the plurality of candidate roll angles comprises:

counting a quantity of lane line images in the lane line image set corresponding to each of the candidate roll angles that meet a first condition, the first condition being set based on a distance between adjacent lane lines in the lane line image; and determining one of the plurality of roll angles corresponding to the lane line image set in which the quantity of lane line images meets a second condition as the roll angle of the on-board camera.

12. The method according to claim 11, wherein the first condition comprises: a difference between a maximum spacing and a minimum spacing between the adjacent lane lines in the lane line image is less than or equal to a threshold.

13. The method according to claim 11, wherein the second condition comprises: the quantity of lane line images is a maximum value.

14. The method according to claim 1, wherein the selecting the plurality of image groups from the image frame sequence comprises:

moving a sliding window to a plurality of different positions in the image frame sequence to obtain the plurality of image groups, a plurality of consecutive image frames in the sliding window at each position corresponding to one image group.

15. The method according to claim 1, wherein the method further comprises:

deleting a lane line image in the lane line image set that meets a third condition, to obtain a screened lane line image set, the third condition comprising at least one of: a lane line fitting error is greater than or equal to a first threshold, or a quantity of the at least one lane line in a lane line image is less than or equal to a second threshold; and the determining the roll angle of the on-board camera based on the lane line image sets respectively corresponding to the plurality of candidate roll angles comprises:

determining the roll angle of the on-board camera based on screened lane line image sets respectively corresponding to the plurality of candidate roll angles.

16. The method according to claim 1, wherein the method further comprises:

applying the roll angle of the on-board camera to a navigation map, to determine a lane in which the vehicle is located; and performing navigation prompt or automatic driving control based on the lane in which the vehicle is located.

17. A computer device, comprising a processor and a memory, the memory storing a computer program, the computer program being loaded and executed by the processor to implement a method for calibrating a roll angle of an on-board camera, the method being performed by a computer device, and the method comprising:

obtaining an image frame sequence collected by the on-board camera while a vehicle is in motion, the image frame sequence comprising n image frames of a road captured by the on-board camera at n timestamps, n being an integer greater than 1;

selecting a plurality of image groups from the image frame sequence, each of the image groups comprising a plurality of consecutive image frames in the image frame sequence;

for each of a plurality of candidate roll angles:
for each image group, determining a lane line image at the respective candidate roll angle, wherein lane line detection points are extracted from the consecutive image frames in the respective image group, and the lane line image comprises at least one lane line determined by fitting the lane line detection points; and
obtaining a lane line image set comprising lane line images respectively corresponding to the image groups;

and determining the roll angle of the on-board camera based on a first quantity of lane line images in at least one of lane line image sets respectively corresponding to the plurality of candidate roll angles and at least one condition.

18. The computer device according to claim 17, wherein for each image group, determining the lane-line image at the respective candidate roll angle comprises:

obtaining first lane line detection results corresponding to K image frames in the respective image group, each of the first lane line detection results comprising lane line detection points obtained through detection of a lane line in each of the K image frames, and K being an integer greater than 1;

integrating the first lane line detection results corresponding to the K image frames in the respective image group, to obtain a second lane line detection result corresponding to the respective image group at the respective candidate roll angle; and fitting the second lane line detection result corresponding to the respective image group at the respective candidate roll angle, to obtain the lane line image corresponding to the respective image group at the respective candidate roll angle.

19. A non-transitory computer-readable storage medium, storing a computer program, the computer program being loaded and executed by a processor to implement a method for calibrating a roll angle of an on-board camera, the method being performed by a computer device, and the method comprising:

obtaining an image frame sequence collected by the on-board camera while a vehicle is in motion, the image frame sequence comprising n image frames of a road captured by the on-board camera at n timestamps, n being an integer greater than 1;

selecting a plurality of image groups from the image frame sequence, each of the image groups comprising a plurality of consecutive image frames in the image frame sequence;

for each of a plurality of candidate roll angles:
      for each image group, determining a lane line image at the respective candidate roll angle, wherein lane line detection points are extracted from the consecutive image frames in the respective image group, and the lane line image comprises at least one lane line determined by fitting the lane line detection points; and obtaining a lane line image set comprising lane line images respectively corresponding to the image groups;

and determining the roll angle of the on-board camera based on a first quantity of lane line images in at least one of lane line image sets respectively corresponding to the plurality of candidate roll angles and at least one condition.

20. The computer-readable storage medium according to claim 19, wherein for each image group, determining the lane-line image at the respective candidate roll angle comprises:

obtaining first lane line detection results corresponding to K image frames in the respective image group, each of the first lane line detection results comprising lane line detection points obtained through detection of a lane line in each of the K image frames, and K being an integer greater than 1;

integrating the first lane line detection results corresponding to the K image frames in the respective image group, to obtain a second lane line detection result corresponding to the respective image group at the respective candidate roll angle; and fitting the second lane line detection result corresponding to the respective image group at the respective candidate roll angle, to obtain the lane line image corresponding to the respective image group at the respective candidate roll angle.

* * * * *